United States Patent
Ishii et al.

(10) Patent No.: US 8,778,583 B2
(45) Date of Patent: Jul. 15, 2014

(54) TONER, DEVELOPER, IMAGE FORMING APPARATUS, AND PROCESS CARTRIDGE

(71) Applicants: Masayuki Ishii, Shizuoka (JP); Toyoshi Sawada, Kanagawa (JP)

(72) Inventors: Masayuki Ishii, Shizuoka (JP); Toyoshi Sawada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 46 days.

(21) Appl. No.: 13/678,797

(22) Filed: Nov. 16, 2012

(65) Prior Publication Data

US 2013/0164665 A1 Jun. 27, 2013

(30) Foreign Application Priority Data

Dec. 26, 2011 (JP) ................... 2011-282811

(51) Int. Cl.
*G03G 9/08* (2006.01)

(52) U.S. Cl.
USPC ............ 430/108.1; 430/105; 430/108.2; 430/108.3

(58) Field of Classification Search
USPC .............. 430/105, 108.1, 108.2, 108.3
See application file for complete search history.

(56) References Cited

U.S. PATENT DOCUMENTS

| | | |
|---|---|---|
| 2002/0037467 A1 | 3/2002 | Watanabe et al. |
| 2002/0132177 A1 | 9/2002 | Sawada et al. |
| 2002/0136975 A1 | 9/2002 | Shiraishi et al. |
| 2003/0077534 A1 | 4/2003 | Shiraishi et al. |
| 2003/0096183 A1 | 5/2003 | Katoh et al. |
| 2003/0129518 A1 | 7/2003 | Sawada et al. |
| 2003/0219670 A1 | 11/2003 | Sawada et al. |
| 2004/0157147 A1 | 8/2004 | Shiraishi et al. |
| 2004/0234879 A1 | 11/2004 | Hasegawa et al. |
| 2005/0008961 A1 | 1/2005 | Takada et al. |
| 2005/0214670 A1 | 9/2005 | Matsumoto et al. |
| 2005/0250037 A1 | 11/2005 | Sawada et al. |
| 2005/0277046 A1 | 12/2005 | Sawada et al. |
| 2006/0063081 A1 | 3/2006 | Nagatomo et al. |
| 2006/0204883 A1 | 9/2006 | Nakayama et al. |
| 2006/0240351 A1 | 10/2006 | Sugiura et al. |
| 2007/0031748 A1 | 2/2007 | Kotsugai et al. |
| 2007/0059628 A1 | 3/2007 | Tanaka et al. |
| 2007/0218383 A1 | 9/2007 | Seshita et al. |
| 2007/0218387 A1 | 9/2007 | Ishii et al. |
| 2007/0275315 A1 | 11/2007 | Nagatomo et al. |
| 2008/0014527 A1 | 1/2008 | Kotsugai et al. |
| 2008/0076055 A1 | 3/2008 | Sawada et al. |
| 2008/0226998 A1 | 9/2008 | Ishii et al. |
| 2008/0254378 A1 | 10/2008 | Matsumoto et al. |
| 2008/0268366 A1 | 10/2008 | Nakayama et al. |
| 2008/0292361 A1 | 11/2008 | Seshita et al. |
| 2009/0074467 A1 | 3/2009 | Seshita et al. |
| 2009/0142094 A1 | 6/2009 | Sawada et al. |
| 2010/0104965 A1 | 4/2010 | Inoue et al. |
| 2010/0119255 A1 | 5/2010 | Seshita et al. |
| 2010/0216068 A1 | 8/2010 | Kotsugai et al. |

(Continued)

FOREIGN PATENT DOCUMENTS

| | | |
|---|---|---|
| JP | 2000-019753 | 1/2000 |

(Continued)

*Primary Examiner* — Hoa V Le (74) *Attorney, Agent, or Firm* — Oblon, Spivak, McClelland, Maier & Neustadt, L.L.P.

(57) ABSTRACT

A toner including a mother particle and an external additive covering a surface of the mother particle is provided. The mother particle includes a binder resin, a colorant, and a release agent. The external additive includes a particulate cellulose having a number average particle diameter within a range of 15 to 105 nm.

10 Claims, 2 Drawing Sheets

(56) References Cited

U.S. PATENT DOCUMENTS

| | | |
|---|---|---|
| 2011/0129775 A1 | 6/2011 | Sawada et al. |
| 2011/0136051 A1 | 6/2011 | Ishii et al. |

FOREIGN PATENT DOCUMENTS

| | | |
|---|---|---|
| JP | 2007-156099 | 6/2007 |
| JP | 2007-248911 | 9/2007 |
| JP | 2007-279702 | 10/2007 |
| JP | 2008-116568 | 5/2008 |

TONER, DEVELOPER, IMAGE FORMING APPARATUS, AND PROCESS CARTRIDGE

CROSS-REFERENCE TO RELATED APPLICATIONS

This patent application is based on and claims priority pursuant to 35 U.S.C. §119 to Japanese Patent Application No. 2011-282811, filed on Dec. 26, 2011, in the Japan Patent Office, the entire disclosure of which is hereby incorporated by reference herein.

BACKGROUND

1. Technical Field

The present disclosure relates to a toner for use in electrophotographic or electrostatic recording apparatuses. The present disclosure also relates to a one-component or two-component developer, an image forming apparatus, and a process cartridge each using the above toner.

2. Description of Related Art

A typical electrophotographic method includes an electrostatic latent image forming process in which an electrostatic latent image is formed on a photoreceptor including a photoconductive substance; a developing process in which the electrostatic latent image is developed into a toner image with a toner; a transfer process in which the toner image is transferred onto a transfer material such as paper; a fixing process in which the toner image is fixed on the transfer material by application of heat, pressure, and/or solvent vapor; and a cleaning process in which residual toner particles remaining on the photoreceptor are removed.

Generally, a toner includes a particulate material having an average primary particle diameter of several to several tens nanometer at its surface so as to improve surface properties of the toner. Such a particulate material being present at or covering the surface of a toner may be hereinafter referred to as an "external additive". As an example of the external additive, particulate hydrophobized silicas have been proposed that give chargeability, fluidity, and hydrophobicity to toner. As another example of the external additive, particulate hydrophobized titanium oxides have been proposed that keep chargeability of toner and prevent fluctuation of retaining charge quantity of toner regardless of environmental temperature and humidity conditions.

JP-2007-248911-A describes a toner including a colored particle, an external additive, and an organic particle having a weight average particle diameter of 2 to 15 μm and pores on its surface.

JP-2007-156099-A describes a toner including a particulate hydrophobized material as an external additive to have a certain specific surface area.

JP-2008-116568-A describes a toner including a specific amount of a structure comprised of a crystalline polyester resin and a release agent.

JP-2007-279702-A describes a toner including a non-spherical irregular-shaped silica (having a long diameter of 40 to 120 nm) as an external additive.

JP-2000-19753-A describes a toner including a first inorganic particulate material having a particle diameter of 0.1 μm or less and a second inorganic particulate material having a particle diameter of 0.12 to 3.0 μm.

As described above, various types of external additives have been proposed for the purpose of reliably improving performance of electrophotographic processes. At the same time, toner particles themselves have been developed for the purpose of improving performance, printing speed, and lifespan of electrophotographic processes. For example, one proposal for improving fixability of toner involves making wax particles present at the surface of the toner and another proposal involves including a crystalline material in the toner that requires less melting energy.

However, these proposals may cause another problem such that the wax or crystalline material films a photoreceptor with its thin layer ("filming problem") to degrade image quality.

SUMMARY

In accordance with some embodiments, a toner including a mother particle and an external additive covering a surface of the mother particle is provided. The mother particle includes a binder resin, a colorant, and a release agent. The external additive includes a particulate cellulose having a number average particle diameter within a range of 15 to 105 nm.

In accordance with some embodiments, a one-component developer including the above toner and no carrier, and a two-component developer including the above toner and a carrier are provided.

In accordance with some embodiments, an image forming apparatus is provided. The image forming apparatus includes a latent image bearing member adapted to bear an electrostatic latent image, a charger adapted to charge a surface of the latent image bearing member, an irradiator adapted to irradiate the charged surface of the latent image bearing member to form an electrostatic latent image thereon, a developing device adapted to develop the electrostatic latent image into a toner image with the above toner, and a transfer device adapted to transfer the toner image onto a transfer material.

In accordance with some embodiments, a process cartridge detachably attachable to image forming apparatuses is provided. The process cartridge includes a latent image bearing member adapted to bear an electrostatic latent image, and a developing device adapted to develop the electrostatic latent image into a toner image with the above toner.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

According to an embodiment, a toner including a mother particle and an external additive covering a surface of the mother particle is provided. The mother particle includes a binder resin, a colorant, and a release agent. The external additive includes a particulate cellulose having a number average particle diameter within a range of 15 to 105 nm.

By including the particulate cellulose having a number average particle diameter within a range of 15 to 105 nm, the toner effectively suppresses deteriorating effects of problematic substances, such as alcoholic substances that may exude from the release agent and/or binder resin when the toner is exposed to heat, pressure, and/or stress. In particular, the particulate cellulose effectively removes such problematic substances and prevents them from undesirably filming (contaminating) peripheral members. As a result, production of abnormal image and deterioration of image quality (caused by the occurrence of white spots, defective transfer, or background fouling), and the occurrence of photoreceptor damage are prevented. When the number average particle diameter of the particulate cellulose is less than 15 nm, deterioration of image quality and charge stability may still occur. When the number average particle diameter of the particulate cellulose is greater than 105 nm, photoreceptor damage and deterioration of charge stability may still occur.

According to an embodiment, the particulate cellulose is a particulate α-cellulose. According to another embodiment, the particulate cellulose is comprised of a mixture of α-cellulose and β-cellulose (in an amount of about 10%, for example).

The particulate α-cellulose is generally available in the form of pulp obtained from fibrous plants. Owing to its shape and the presence of fine micro pores at its surface, the particulate α-cellulose exerts a greater removing power than a spherical or needle-like abrading agent that is likely to roll on a surface to be abraded. Generally, in a case in which resin or wax substances are fixedly adhered to a surface of a photoreceptor, they are removed with an abrading agent, i.e., a substance having a high hardness, such as alumina or cerium oxide. On the other hand, according to an embodiment, such resin or wax substances can be removed with the particulate cellulose by being caught in its fine micro pores.

According to an embodiment, the toner further includes another external additive other than the particulate cellulose having a number average particle diameter of 15 to 105 nm.

Usable external additives include, for example, particulate silicas, particulate titanium compounds, particulate aluminas, particulate cerium oxides, particulate calcium carbonates, particulate magnesium carbonates, particulate calcium phosphates, particulate fluorine-containing resins, particulate silicon-containing resins, and particulate nitrogen-containing resins.

In some embodiments, a particulate hydrophobized silica or a particulate hydrophobized titanium oxide is used.

In some embodiments, a particulate hexamethyldisilazane-treated hydrophobized silica or a particulate isobutyl-treated hydrophobized titanium oxide is used. Particulate hydrophobized silicas generally have a function of giving chargeability, fluidity, and hydrophobicity to toner. In some embodiments, a particulate hydrophobized silica having an average primary particle diameter of about 8 to 120 nm is used.

In some embodiments, the content of the particulate hydrophobized silica is 0.5 to 8% by weight based on the total weight of the mother particle. When the content is less than 0.5% by weight, fluidity and chargeability of the toner may deteriorate. In particular, chargeability may significantly deteriorate in high-humidity environmental conditions. When the content is greater than 8% by weight, hydrophobized silica particles which are liberated without being adhered to the mother particle may undesirably adhere to the surface of carrier particles or photoreceptor.

In some embodiments, a particulate titanium compound having a specific weight within a range of 2.8 to 3.6 $g/cm^2$ is used.

In some embodiments, a particulate titanium oxide obtained by reacting at least a part of $TiO(OH)_2$ prepared by a wet method with a silane compound or silicone oil is used.

Particulate hydrophobized titanium oxides generally have a function of keeping chargeability of toner and preventing fluctuation of retaining charge quantity thereof regardless of environmental temperature and humidity conditions. In some embodiments, a particulate hydrophobized titanium oxide having an primary average particle diameter of about 12 to 55 nm is used.

In some embodiments, the content of the particulate hydrophobized titanium oxide is 0.2 to 5% by weight based on the total weight of the mother particle. When the content is less than 0.2% by weight, the particulate hydrophobized titanium oxide cannot exert its effect, i.e., cannot prevent fluctuation of charge quantity of the toner regardless of environmental temperature and humidity conditions, resulting in images with unstable image density. When the content is greater than 5% by weight, resistivity and chargeability of the toner may deteriorate and the charge quantity distribution of the toner may be broadened, resulting in the occurrence of toner scattering and images with unstable image density.

In some embodiments, the external additive includes at least one material having a specific surface area within a range of 20 to 300 $m^2/g$.

The mother particle including a binder resin, a colorant, and a release agent is described in detail below.

Specific examples of usable binder resins include, but are not limited to, homopolymers of styrene or styrene derivatives (e.g., polystyrene, poly(p-chlorostyrene), polyvinyl toluene), styrene-based copolymers (e.g., styrene-p-chlorostyrene copolymer, styrene-propylene copolymer, styrene-vinyltoluene copolymer, styrene-methyl acrylate copolymer, styrene-ethyl acrylate copolymer, styrene-methacrylic acid copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ether copolymer, styrene-vinyl methyl ketone copolymer, styrene-butadiene copolymer, styrene-isoprene copolymer, styrene-maleate copolymer), polymethyl methacrylate, polybutyl methacrylate, polyvinyl chloride, polyvinyl acetate, polyethylene, polyester, polyurethane, epoxy resin, polyvinyl butyral, polyacrylic acid, rosin, modified rosin, terpene resin, phenol resin, aliphatic or aromatic hydrocarbon resin, and aromatic petroleum resin. Two or more of these resins can be used in combination.

In some embodiments, polyesters, such as an unmodified polyester, a modified polyester, or a crystalline polyester, are used as the binder resin.

The mother particle may be produced by any method, such as a pulverization method, an emulsion polymerization method, a suspension polymerization method, and a polymer suspension method. In a pulverization method, a mixture of toner constituents is melt-kneaded and the melt-kneaded product is classified by size. The mother particle may be also produced by preparing a toner constituent liquid ("oily phase") by dissolving or dispersing toner constituents in an organic solvent, emulsifying the toner constituent liquid ("oily phase") in an aqueous medium ("aqueous phase"), and removing the organic solvent from the emulsion.

In this method, the toner constituents may include a binder resin and/or a precursor thereof, a colorant, and a release agent.

The binder resin and/or a precursor thereof may include a modified polyester having both ester bonds and other bonds, a resin precursor capable of forming the modified polyester, and/or a crystalline polyester.

Additionally, the binder resin may include an unmodified polyester having no bonds other than ester bonds. Thus, the binder resin may be comprised of any combination of the above-described materials, i.e., an unmodified polyester, a resin precursor having ester bonds, a modified polyester having both ester bonds and other bonds, a resin precursor capable of forming the modified polyester, and a crystalline polyester.

In some embodiments, the binder resin is a combination of an unmodified polyester and a modified polyester (e.g., urea-modified polyester). Such a combination use of an unmodified polyester and a modified polyester is advantageous in improving gloss of full-color images compared to a single use of a modified polyester. The unmodified polyester and modified polyester may be at least partially compatible with each other in view of low-temperature fixability and hot offset resistance of the toner. Therefore, the unmodified polyester and modified polyester may be composed of similar constituents.

In some embodiments, the unmodified polyester has a hydroxyl value within a range of 5 or more, 10 to 120, or 20 to 80. When the hydroxyl value is less than 5, both heat-resistant storage stability and low-temperature fixability of the toner may be poor.

In some embodiments, the unmodified polyester has an acid value within a range of 1 to 30, or 5 to 20. When the acid value is within the above range, the toner tends to be negatively chargeable.

When the acid and/or hydroxyl values are beyond the above-described ranges, it is likely that the resulting image deteriorates in high-temperature and high-humidity conditions or low-temperature and low-humidity conditions.

Here, the modified polyester is defined as a polyester having both ester bonds and other bonds. The modified polyester can be obtained by reacting a compound having an active hydrogen group with a polyester having a functional group reactive with the active hydrogen group. Here, the compound having an active hydrogen group and the polyester having a functional group reactive with the active hydrogen group are both resin precursors capable of forming the modified polyester.

The polyester having a functional group reactive with the active hydrogen group may be, for example, a polyester prepolymer having an isocyanate or epoxy group. The polyester having a functional group reactive with the active hydrogen group can be easily obtained by, for example, reacting a compound having an isocyanate or epoxy group with a base polyester.

For example, an urea-modified polyester (having both ester bonds and urea bonds) can be obtained by reacting (or elongating) a polyester having an isocyanate group (e.g., a polyester prepolymer) with a compound having an active hydrogen group (e.g., an amine). Such an urea-modified polyester as the binder resin gives a wide fixable temperature range to the toner. Such an urea-modified polyester as the binder resin further gives better heat-resistant storage stability to the toner even its glass transition temperature is relatively low.

Specific examples of the compound having an isocyanate group include, but are not limited to, aliphatic polyisocyanates, alicyclic polyisocyanates, aromatic diisocyanates, aromatic aliphatic diisocyanates, isocyanurates, and the above polyisocyanates in which the isocyanate group is blocked with a phenol derivative, an oxime, or a caprolactam. Specific examples of the compound having an epoxy group include, but are not limited to, epichlorohydrin.

As described above, the binder resin may include a crystalline polyester. A crystalline polyester can be obtained by reacting alcohol components with acid components. Here, the crystalline polyester is defined as a polyester having a melting point. For example, a crystalline polyester can be obtained by reacting alcohol components selected from saturated aliphatic diols having a carbon number of 2 to 12 (e.g., 1,4-butanediol, 1,6-hexanediol, 1,8-octanediol, 1,10-decanediol, 1,12-dodecanediol) and derivatives thereof, with acid components selected from dicarboxylic acids having C=C double bonds and a carbon number of 2 to 12, saturated dicarboxylic acids having a carbon number of 2 to 12 (e.g., fumaric acid, 1,4-butanedioic acid, 1,6-hexanedioic acid, 1,8-octanedioic acid, 1,10-decanedioic acid, 1,12-dodecanedioic acid), and derivatives thereof.

The crystalline polyester as the binder resin prevents the release agent present at the surface of the mother particle from contaminating carrier particles or charging members while keeping the toner easily releasable from a fixing member when being fixed on a recording medium.

In some embodiments, the crystalline polyester is dispersed within the mother particle forming particles having a long-axis diameter within a range of 0.2 to 3.0 μm with the ratio of the long-axis diameter to the short-axis diameter being 3 or more. When the long axis diameter is less than 0.2 μm and the ratio of the long-axis diameter to the short-axis is less than 3, the crystalline polyester cannot satisfactorily exerts its favorable effect on low-temperature fixability and chargeability of the toner. When the long-axis diameter is greater than 3.0 μm, the mother particle may be considerably deformed by the dispersed particles and easily broken into pieces in image forming apparatuses. Moreover, such large dispersed particles are likely to be present at the surface of the mother particle or, in extreme cases, to be liberated therefrom, and contaminate carrier particles or peripheral members, resulting in deterioration of charge stability and environmental stability of toner.

In some embodiments, when the crystalline polyester is subjected to differential scanning calorimetry (DSC), an endothermic peak is observed at a temperature within a range of 50 to 150° C.

When the endothermic peak is observed at a temperature less than 50° C., the toner may aggregate when stored at high temperatures, resulting in deterioration of heat-resistant storage stability. The toner may also cause blocking even at the inner temperature of a developing device. When the endothermic peak is observed at a temperature greater than 150° C., the toner may not be reliably fixed on recording media at lower temperatures.

In some embodiments, the content of the crystalline polyester is within a range of 1 to 30 parts by weight based on 100 parts by weight of the mother particle. When the content is less than 1 part by weight, low-temperature fixability of the toner may be poor. When the content is greater than 30 parts by weight, too large an amount of the crystalline polyester is present at the surface of the mother particle to prevent them from contaminating photoreceptors or other peripheral members or deteriorating fluidity thereof. Moreover, the crystalline polyester present at the surface of the mother toner may contaminate carrier particles, resulting in deterioration of charge stability and environmental stability of toner.

As described above, the binder resin may include any combination, such as a combination of the unmodified polyester and the modified polyester (having both ester bonds and other bonds), a combination of the unmodified polyester and the crystalline polyester, and a combination of the modified polyester, the unmodified polyester, and the crystalline polyester. Each combination gives the toner hot offset resistance, heat-resistant storage stability, and low-temperature fixability at the same time.

In some embodiments, the binder resin has a glass transition temperature (Tg) within a range to 40 to 70° C. or 40 to 65° C. When Tg is less than 40° C., heat-resistant storage stability of the toner may be poor. When Tg is greater than 70° C., low-temperature fixability of the toner may be poor.

Specific examples of usable colorants include, but are not limited to, carbon black, Nigrosine dyes, black iron oxide, NAPHTHOL YELLOW S, HANSA YELLOW (10G, 5G and G), Cadmium Yellow, yellow iron oxide, loess, chrome yellow, Titan Yellow, polyazo yellow, Oil Yellow, HANSA YELLOW (GR, A, RN and R), Pigment Yellow L, BENZIDINE YELLOW (G and GR), PERMANENT YELLOW (NCG), VULCAN FAST YELLOW (5G and R), Tartrazine Lake, Quinoline Yellow Lake, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet Gc Brilliant Fast Scarlet, Brilliant Carmine BS, PERMANENT RED (F2R, F4R, FRL, FRLL and F4RH), Fast Scarlet VD, VULCAN FAST RUBINE B, Brilliant Scarlet G, LITHOL RUBINE GX, Permanent Red FSR, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, and lithopone. Two or more of these colorants can be used in combination.

In some embodiments, the content of the colorant in the mother particle is within a range of 1 to 15% by weight or 3 to 10% by weight.

The colorant can be combined with a resin to be used as a master batch. Specific examples of usable resins for the master batch include, but are not limited to, homopolymers of styrene or styrene derivatives, styrene-based copolymers, polymethyl methacrylate, polybutyl methacrylate, polyvinyl chloride, polyvinyl acetate, polyethylene, polypropylene, polyester, epoxy resin, epoxy polyol resin, polyurethane, polyamide, polyvinyl butyral, polyacrylic acid, rosin, modified rosin, terpene resin, aliphatic or alicyclic hydrocarbon resin, aromatic petroleum resin, chlorinated paraffin, and paraffin wax. Two or more of these resins can be used in combination.

Specific examples of usable release agents include, but are not limited to, waxes. Specific examples of usable waxes include, but are not limited to, carbonyl-group-containing waxes, polyolefin waxes, and long-chain hydrocarbons. Two or more of these waxes can be used in combination. In some embodiments, carbonyl-group-containing waxes are used.

Specific examples of the carbonyl-group-containing waxes include, but are not limited to, polyalkanoic acid esters, polyalkanol esters, polyalkanoic acid amides, polyalkyl amides, and dialkyl ketones. Specific examples of the polyalkanoic acid esters include, but are not limited to, carnauba wax, montan wax, trimethylolpropane tribehenate, pentaerythritol tetrabehenate, pentaerythritol diacetate dibehenate, glycerin tribehenate, and 1,18-octadecanediol distearate. Specific examples of the polyalkanol esters include, but are not limited to, tristearyl trimellitate and distearyl maleate. Specific examples of the polyalkanoic acid amides include, but are not limited to, dibehenylamide. Specific examples of the polyalkyl amides include, but are not limited to, trimellitic acid tristearylamide. Specific examples of the dialkyl ketones include, but are not limited to, distearyl ketone. Specific examples of the polyolefin waxes include, but are not limited to, polyethylene wax and polypropylene wax. Specific examples of the long-chain hydrocarbons include, but are not limited to, paraffin wax and SAZOL wax.

In some embodiments, the release agent has a melting point within a range of 40 to 160° C., 50 to 120° C., or 60 to 90° C. When the melting point is less than 40° C., heat-resistant storage stability of the toner may be poor. When the melting point is greater than 160° C., cold offset resistance of the toner may be poor.

In some embodiments, the release agent has a melt-viscosity within a range of 5 to 1,000 cps or 10 to 100 cps, at a temperature 20° C. higher than the melting point. When the melt-viscosity is less than 5 cps, releasability of the toner may be poor. When the melt-viscosity is greater than 1,000 cps, hot offset resistance and low-temperature fixability of the toner may be poor.

In some embodiments, the content of the release agent in the mother particle is within a range of 1 to 40% by weight or 3 to 30% by weight. When the content of the release agent is greater than 40% by weight, fluidity of the toner may be poor.

The mother particle may further include a charge controlling agent. The charge controlling agent may be either negative or positive.

Specific examples of usable negative charge controlling agents include, but are not limited to, resins and compounds having an electron-donating functional group, azo dyes, and metal complexes of organic acids. Specific examples of commercially available negative charge controlling agents include, but are not limited to, BONTRON® S-31, S-32, S-34, S-36, S-37, S-39, S-40, S-44, E-81, E-82, E-84, E-86, E-88, A, 1-A, 2-A, and 3-A (from Orient Chemical Industries Co., Ltd.); KAYACHARGE N-1 and N-2 and KAYASET BLACK T-2 and 004 (from Nippon Kayaku Co., Ltd.); AIZEN SPILON BLACK T-37, T-77, T-95, TRH, and TNS-2 (from Hodogaya Chemical Co., Ltd.); and FCA-1001-N, FCA-1001-NB, and FCA-1001-NZ (from Fujikura Kasei Co., Ltd.). Two or more of these materials can be used in combination.

Specific examples of usable positive charge controlling agents include, but are not limited to, basic compounds such as nigrosine dyes, cationic compounds such as quaternary ammonium salts, and metal salts of higher fatty acids. Specific examples of commercially available positive charge controlling agents include, but are not limited to, BONTRON® N-01, N-02, N-03, N-04, N-05, N-07, N-09, N-10, N-11, N-13, P-51, P-52, and AFP-B (from Orient Chemical Industries Co., Ltd.); TP-302, TP-415, and TP-4040 (from Hodogaya Chemical Co., Ltd.); COPY BLUE® PR and COPY CHARGE® PX-VP-435 and NX-VP-434 (from Hoechst AG); FCA 201, 201-B-1, 201-B-2, 201-B-3, 201-PB, 201-PZ, and 301 (from Fujikura Kasei Co., Ltd.); and PLZ 1001, 2001, 6001, and 7001 (from Shikoku Chemicals Corporation). Two or more of these materials can be used in combination.

In some embodiments, the content of the charge controlling agent is within a range of 0.1 to 10% by weight or 0.2 to 5% by weight, based on 100% by weight of the binder resin. When the content of the charge controlling agent is greater than 10% by weight, the toner may be excessively charged and attracted to a developing roller with an excessive attraction force, resulting in deterioration of fluidity and image density. When the content of the charge controlling agent is less than 0.1% by weight, the toner may not be quickly or sufficiently charged, resulting in poor image quality.

The mother particle may be produced by any method, such as a pulverization method, an emulsion polymerization method, a suspension polymerization method, and a polymer suspension method.

According to an embodiment, the toner is prepared by covering the surface of the mother particle, obtained by (I) a pulverization method or (II) emulsifying the toner constituent liquid ("oily phase") in an aqueous medium ("aqueous phase"), with an external additive including a particulate cellulose having a number average particle diameter of 15 to 105 nm.

In the method (II), the resulting mother particle can be more easily controlled to have a spherical shape and a desired particle size distribution.

The pulverization method (I) is described in detail below. First, a mixture of raw materials of the mother particle is melt-kneaded by a melt-kneader. Usable melt-kneaders include single-axis or double-axis continuous kneaders and roll mill batch kneaders. Specific examples of commercially-available melt-kneaders include, but are not limited to, TWIN SCREW EXTRUDER KTK (from Kobe Steel, Ltd.), TWIN SCREW COMPOUNDER TEM (from Toshiba Machine Co., Ltd.), MIRACLE K.C.K (from Asada Iron Works Co., Ltd.), TWIN SCREW EXTRUDER PCM (from Ikegai Co., Ltd.), and KOKNEADER (from Buss Corporation). The melt-kneading conditions are adjusted so as not to cut molecular chains of the binder resin. For example, when the melt-kneading temperature is too much higher than the softening point of the binder resin, molecular chains may be excessively cut. When the melt-kneading temperature is too much lower than the softening point of the binder resin, the raw materials may not be sufficiently kneaded.

Next, the resulting kneaded product is pulverized. The kneaded product may be first pulverized into coarse particles and subsequently pulverized into fine particles. Specific pulverization methods include, for example, a method in which the kneaded product is brought into collision with a collision plate in a jet stream, a method in which particles are brought into collision with each other in a jet stream, and a method in which the kneaded product is pulverized within a narrow gap between mechanically rotating rotor and stator. The resulting particles are classified by size, and particles within a predetermined size range are collected. Undesired fine particles are removed by cyclone separation, decantation, or centrifugal separation, for example. Undesired coarse or aggregated particles are removed by a sieve having a mesh size of 250 or more.

The method (II) is described in detail below. In the method (II), the mother toner is prepared by the processes of preparing a toner constituent liquid ("oily phase") by dissolving or dispersing toner constituents including at least a binder resin and/or a precursor thereof in an organic solvent, emulsifying the toner constituent liquid ("oily phase") in an aqueous medium ("aqueous phase"), and removing the organic solvent from the emulsion.

According to some embodiments, the volume average particle diameter (Dv) of the mother particle is not less than 3.0 μm and less than 6.0 μm and the ratio (Dv/Dn) of the volume average particle diameter (Dv) to the number average particle diameter (Dn) is within a range of 1.05 to 1.25.

When Dv is less than 3.0 μm, transferability and cleanability of the toner may be poor. When Dv is less than 3.0 μm, when the resulting two-component developer is agitated in a developing device for a long term, the toner particles may adhere to carrier particles and degrade charging ability thereof. In the resulting one-component developer, the toner particles may film a developing roller or adhere to a toner layer regulating blade.

When Dv is 6.0 μm or more, it may be difficult for the toner particles to produce high-resolution and high-quality toner image. The average toner particle size in the resulting developer may vary very much as the toner particles are repeatedly consumed and supplied. When the ratio (Dv/Dn) is greater than 1.25, the same phenomena may occur. When the ratio (Dv/Dn) is less than 1.05, behavior of the toner particles is stabilized and changeability thereof is homogenized, however, the toner particles may not be sufficiently charged or cleanability may deteriorate.

The toner including the above mother particle provides a good combination of heat-resistant storage stability, low-temperature fixability, hot offset resistance, and proper image gloss without degrading chargeability. When such a toner is used for a two-component developer, the average toner particle size therein may not vary very much although consumption and supply of the toner particles are repeated. Thus, the two-component developer reliably provides stable developability for an extended period of time. When such a toner is used for a one-component developer, the average toner particle size therein may not vary very much although consumption and supply of the toner particles are repeated. Additionally, the toner particles may not film a developing roller or adhere to a toner layer regulating blade. Thus, the one-component developer reliably provides stable developability and image quality for an extended period of time.

According to an embodiment, the mother particle is prepared by dissolving or dispersing toner constituents including a compound having an active hydrogen group and a polyester resin reactive with the active hydrogen group (hereinafter "prepolymer (A)") in an organic solvent to prepare a toner constituent liquid, dispersing the toner constituent liquid in an aqueous medium containing a resin particle, and reacting the prepolymer (A) with the compound having an active hydrogen group in the aqueous medium. Here, the toner constituents further include a colorant and a release agent, and optionally include other materials, if needed.

The prepolymer (A) is a reaction product of a polyester resin having an active hydrogen group with a polyisocyanate (3). The polyester resin is a polycondensation product of a polyol (1) with a polycarboxylic acid (2). The active hydrogen group may be, for example, a hydroxyl group (e.g., an alcoholic hydroxyl group, a phenolic hydroxyl group), an amino group, a carboxyl group, or a mercapto group.

Specific examples of the polyol (1) include, but are not limited to, alkylene glycols (e.g., ethylene glycol, 1,2-propylene glycol, 1,3-propylene glycol, 1,4-butanediol, 1,6-hexanediol); alkylene ether glycols (e.g., diethylene glycol, triethylene glycol, dipropylene glycol, polyethylene glycol, polypropylene glycol, polytetramethylene ether glycol); alicyclic diols (e.g., 1,4-cyclohexanedimethanol, hydrogenated bisphenol A); bisphenols (e.g., bisphenol A, bisphenol F, bisphenol S); 4,4'-dihydroxy biphenyls (e.g., 3,3'-difluoro-4,4'-dihydroxy biphenyl); bis(hydroxyphenyl)alkanes (e.g., bis (3-fluoro-4-hydroxyphenyl)methane, 1-phenyl-1,1-bis(3-fluoro-4-hydroxyphenyl)ethane, 2,2-bis(3-fluoro-4-hydroxyphenyl)propane, 2,2-bis(3,5-difluoro-4-hydroxyphenyl)propane (also known as tetrafluorobisphenol A), 2,2-bis(3-hydroxyphenyl)-1,1,1,3,3,3-hexafluoropropane); bis(4-hydroxyphenyl)ethers (e.g., bis(3-fluoro-4-hydroxyphenyl)ether); alkylene oxide (e.g., ethylene oxide, propylene oxide, butylene oxide) adducts of the alicyclic diols; and alkylene oxide (e.g., ethylene oxide, propylene oxide, butylene oxide) adducts of the bisphenols. In some embodiments, an alkylene glycol having 2 to 12 carbon atoms or an alkylene oxide adduct of a bisphenol is used. In some embodiments, a mixture of an alkylene oxide adduct of a bisphenol and an alkylene glycol having 2 to 12 carbon atoms is used.

Specific examples of the polyol (1) further include, but are not limited to, polyols having 3 or more valences, such as polyvalent aliphatic alcohols having 3 or more valences (e.g., glycerin, trimethylolethane, trimethylolpropane, pentaerythritol, sorbitol), polyphenols having 3 or more valences (e.g., trisphenol PA, phenol novolac, cresol novolac), and alkylene oxide adducts of the polyphenols having 3 or more valences.

Two or more of these polyols can be used in combination.

Specific examples of the polycarboxylic acid (2) include, but are not limited to, alkylene dicarboxylic acids (e.g., succinic acid, adipic acid, sebacic acid); alkenylene dicarboxylic acids (e.g., maleic acid, fumaric acid); and aromatic dicarboxylic acids (e.g., phthalic acid, isophthalic acid, terephthalic acid, naphthalenedicarboxylic acid, 3-fluoroisophthalic acid, 2-fluoroisophthalic acid, 2-fluoroterephthalic acid, 2,4,5,6-tetrafluoroisophthalic acid, 2,3,5,6-tetrafluoroterephthalic acid, 5-trifluoromethyl isophthalic acid, 2,2-bis (4-carboxyphenyl)hexafluoropropane, 2,2-bis(3-carboxyphenyl)hexafluoropropane, 2,2'-bis(trifluoromethyl)-4,4'-biphenyl dicarboxylic acid, 3,3'-bis(trifluoromethyl)-4,4'-biphenyl dicarboxylic acid, 2,2'-bis(trifluoromethyl)-3,3'-biphenyl dicarboxylic acid, hexafluoroisopropylidene diphthalic anhydride). In some embodiments, an alkenylene dicarboxylic acid having 4 to 20 carbon atoms or an aromatic dicarboxylic acid having 8 to 20 carbon atoms is used.

Specific examples of the polycarboxylic acid (2) further include, but are not limited to, polycarboxylic acids having 3 or more valences, such as aromatic polycarboxylic acids having 9 to 20 carbon atoms (e.g., trimellitic acid, pyromellitic acid); and anhydrides, lower alkyl esters (e.g., methyl ester, ethyl ester, isopropyl ester) of the above aromatic polycarboxylic acids.

Two or more of these polycarboxylic acids can be used in combination.

In some embodiments, the equivalent ratio [OH]/[COOH] of hydroxyl groups [OH] in the polyol (1) to carboxyl groups [COOH] in the polycarboxylic acid (2) is within a range of 2/1 to 1/1, 1.5/1 to 1/1, or 1.3/1 to 1.02/1.

In some embodiments, the polyester resin obtained from the polyol (1) and the polycarboxylic acid (2) has a peak molecular weight within a range of 1,000 to 30,000, 1,500 to 10,000, or 2,000 to 8,000. When the peak molecular weight is less than 1,000, heat-resistant storage stability of the toner may be poor. When the peak molecular weight is greater than 30,000, low-temperature fixability of the toner may be poor.

Specific examples of the polyisocyanate (3) include, but are not limited to, aliphatic polyisocyanates (e.g., tetramethylene diisocyanate, hexamethylene diisocyanate, 2,6-diisocyanatomethyl caproate), alicyclic polyisocyanates (e.g., isophorone diisocyanate, cyclohexylmethane diisocyanate), aromatic diisocyanates (e.g., tolylene diisocyanate, diphenylmethane diisocyanate), aromatic aliphatic diisocyanates (e.g., α,α,α',α'-tetramethylxylylene diisocyanate), isocyanurates, and the above polyisocyanates in which the isocyanate group is blocked with a phenol derivative, an oxime, or a caprolactam. Two or more of these materials can be used in combination.

In some embodiments, the equivalent ratio [NCO]/[OH] of isocyanate groups [NCO] in the polyisocyanate (3) to hydroxyl groups [OH] in the polyester resin having an active hydrogen group is within a range of 5/1 to 1/1, 4/1 to 1.2/1, or 2.5/1 to 1.5/1. When the equivalent ratio [NCO]/[OH] is greater than 5, low-temperature fixability of the toner may be poor. When the equivalent ratio [NCO]/[OH] is less than 1, hot offset resistance of the toner may be poor because the content of urethane and urea groups in the resulting modified polyester is too small.

In some embodiments, the content of units from the polyisocyanate (3) in the prepolymer (A) is within a range of 0.5 to 40% by weight, 1 to 30% by weight, or 2 to 20% by weight. When the content of the units is less than 0.5% by weight, offset resistance of the toner may be poor. When the content of the units is greater than 40% by weight, low-temperature fixability of the toner may be poor.

In some embodiments, the number of isocyanate groups included in one molecule of the prepolymer (A) is within a range of 1 or more, 1.5 to 3, or 1.8 to 2.5. When the number of isocyanate groups is less than 1, offset resistance of the toner may be poor because the molecular weight of the resulting modified polyester is too small.

The compound having an active hydrogen group (as an elongating and/or cross-linking agent) that is reactive with the prepolymer (A) may be, for example, an amine (B). The amine (B) may be, for example, a diamine (B1), a polyamine (B2) having 3 or more valences, an amino alcohol (B3), an amino mercaptan (B4), an amino acid (B5), or a blocked amine (B6) in which the amino group in any of the amines (B1) to (B5) is blocked.

Specific examples of the diamine (B1) include, but are not limited to, aromatic diamines (e.g., phenylenediamine, diethyltoluenediamine, 4,4'-diaminodiphenylmethane, tetrafluoro-p-xylylenediamine, tetrafluoro-p-phenylenediamine); alicyclic diamines (e.g., 4,4'-diamino-3,3'-dimethyldicyclohexylmethane, diaminocyclohexane, isophoronediamine); and aliphatic diamines (e.g., ethylenediamine, tetramethylenediamine, hexamethylenediamine, dodecafluorohexylenediamine, tetracosafluorododecylenediamine).

Specific examples of the polyamine (B2) having 3 or more valences include, but are not limited to, diethylenetriamine and triethylenetetramine.

Specific examples of the amino alcohol (B3) include, but are not limited to, ethanolamine and hydroxyethylaniline.

Specific examples of the amino mercaptan (B4) include, but are not limited to, aminoethyl mercaptan and aminopropyl mercaptan.

Specific examples of the amino acid (B5) include, but are not limited to, aminopropionic acid and aminocaproic acid.

Specific examples of the blocked amine (B6) include, but are not limited to, ketimine compounds obtained from the above-described amines (B1) to (B5) and ketones (e.g., acetone, methyl ethyl ketone, methyl isobutyl ketone), and oxazoline compounds.

To control the molecular weight of the resulting modified polyester, a reaction terminator that terminates elongation and/or cross-linking reactions between the prepolymer (A) and the amine (B) can be used. Specific examples of usable reaction terminators include, but are not limited to, monoamines (e.g., diethylamine, dibutylamine, butylamine, laurylamine) and blocked monoamines (e.g., ketimine compounds).

In some embodiments, the equivalent ratio [NCO]/[NHx] of isocyanate groups [NCO] in the prepolymer (A) to amino groups [NHx] in the amine (B) is within a range of 1/2 to 2/1, 1.5/1 to 1/1.5, or 1.2/1 to 1/1.2. When the equivalent ratio [NCO]/[NHx] is greater than 2 or less than 1/2, hot offset resistance of the toner may be poor because the molecular weight of the resulting modified polyester is too small.

The organic solvent in which the toner constituents are dissolved or dispersed may be a volatile solvent having a boiling point less than 100° C. Such a solvent is easily removable in succeeding processes. Specific examples of such organic solvents include, but are not limited to, toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. Two or more of these solvents can be used in combination. In some embodiments, an ester solvent (e.g., methyl acetate, ethyl acetate), an aromatic solvent (e.g., toluene, xylene), or a halogenated hydrocarbon (e.g., methylene chloride, 1,2-dichloroethane, chloroform, carbon tetrachloride) is used. Each of the toner constituents may be dissolved or dispersed in the organic solvent either simultaneously or independently. In the latter case, each of the toner constituents may be dissolved or dispersed in an independent organic solvent. In some embodiments, in view of ease of solvent removal treatment, all of the toner constituents are dissolved or dispersed in a single organic solvent.

In some embodiments, the resin content in the toner constituent liquid ("oily phase") is 40 to 80% by weight. When the resin content is greater than 80% by weight, it may be difficult to dissolve or disperse the toner constituents and the viscosity of the toner constituent liquid is too high to handle. When the resin content is less than 40% by weight, the toner production may be too small. When a polyester resin and a prepolymer are used in combination, each of them may be dissolved or dispersed in either a single organic solvent or an independent organic solvent. Because of having different solubility and viscosity, each of the polyester resin and the prepolymer may be dissolved or dispersed in an independent organic solvent.

The colorant may be dissolved or dispersed in an organic solvent independently. Alternatively, the colorant may be dissolved or dispersed in the solution or dispersion of the polyester resin prepared above. An auxiliary dispersant or a polyester resin may be further added to the colorant solution or dispersion. The colorant may be also used in the form of master batch.

When the release agent is a wax insoluble in the organic solvent, the wax is dispersed in the organic solvent by a typical known method. For example, one method includes mixing the organic solvent and the wax and subjecting the mixture to a dispersion treatment with a disperser such as a bead mill. To make the dispersing time shorter, the mixture may be heated to the melting point of the wax and subsequently cooled while being agitated before being subjected to the dispersion treatment. Two or more of waxes can be used in combination. An auxiliary dispersant or a polyester resin may be further added to the wax solution or dispersion.

The aqueous medium may be, for example, water alone or a mixture of water with a water-miscible solvent. Specific examples of usable water miscible solvents include, but are not limited to, alcohols (e.g., methanol, isopropanol, ethylene glycol), dimethylformamide, tetrahydrofuran, cellosolves (e.g., methyl cellosolve), and lower ketones (e.g., acetone, methyl ethyl ketone). In some embodiments, the used amount of the aqueous medium is within a range of 50 to 2,000 parts by weight or 100 to 1,000 parts by weight, based on 100 parts by weight of the toner components. When the used amount of the aqueous medium is less than 50 parts by weight, the toner constituents may not be finely dispersed. When the used amount of the aqueous medium is greater than 2,000 parts by weight, manufacturing cost may increase.

The aqueous medium, in which the toner constituent liquid is to be dispersed, may contain an inorganic dispersant or a resin particle so that the resulting particles are reliably dispersed in the aqueous medium while having a narrow size distribution.

Specific examples of usable inorganic dispersants include, but are not limited to, tricalcium phosphate, calcium carbonate, titanium oxide, colloidal silica, and hydroxyapatite.

The resin particle may be comprised of a resin capable of forming an aqueous dispersion thereof. Specific examples of such resins include, but are not limited to, thermoplastic and thermosetting resins such as vinyl resin, polyurethane resin, epoxy resin, polyester resin, polyamide resin, polyimide resin, silicone resin, phenol resin, melamine resin, urea resin, aniline resin, ionomer resin, and polycarbonate resin. Two or more of these resins can be used in combination. In some embodiments, a vinyl resin, a polyurethane resin, an epoxy resin, a polyester resin, or a combination thereof is used because they are easy to form an aqueous dispersion of fine spherical particles thereof.

An aqueous dispersion of the resin particle may be produced by the following procedures (a) to (h), for example.

(a) An aqueous dispersion of a vinyl resin is obtainable by directly subjecting raw materials of the resin including a monomer to a suspension polymerization, a seed polymerization, or a dispersion polymerization.

(b) An aqueous dispersion of a polyaddition or polycondensation resin (e.g., polyester resin, polyurethane resin, epoxy resin) is obtainable by dispersing a precursor (e.g., monomer, oligomer) of the resin or a solution thereof in an aqueous medium in the presence of a dispersant, and curing the precursor by application of heat or addition of a curing agent.

(c) An aqueous dispersion of a polyaddition or polycondensation resin (e.g., polyester resin, polyurethane resin, epoxy resin) is obtainable by dissolving an emulsifier in a precursor (e.g., monomer, oligomer) of the resin or a solution (preferably in a liquid state, or which may be liquefied by application of heat) thereof, and further adding water thereto to cause phase-transfer emulsification.

(d) An aqueous dispersion of a resin produced by a polymerization reaction (e.g., addition polymerization, ring-opening polymerization, polyaddition, addition condensation, polycondensation) is obtainable by pulverizing the resin into particles by a mechanical rotary pulverizer or a jet pulverizer, classifying the particles by size to collect desired-size particles, and dispersing the collected particles in an aqueous medium in the presence of a dispersant.

(e) An aqueous dispersion of a resin produced by a polymerization reaction (e.g., addition polymerization, ring-opening polymerization, polyaddition, addition condensation, polycondensation) is obtainable by dissolving the resin in a solvent, spraying the resulting resin solution to form resin particles, and dispersing the resin particles in an aqueous medium in the presence of a dispersant.

(f) An aqueous dispersion of a resin produced by a polymerization reaction (e.g., addition polymerization, ring-opening polymerization, polyaddition, addition condensation, polycondensation) is obtainable by dissolving the resin in a solvent and further adding a solvent to the resulting resin solution, or dissolving the resin in a solvent by application of heat and cooling the resulting resin solution, to precipitate resin particles, removing the solvent to isolate the resin particles, and dispersing the resin particles in an aqueous medium in the presence of a dispersant.

(g) An aqueous dispersion of a resin produced by a polymerization reaction (e.g., addition polymerization, ring-opening polymerization, polyaddition, addition condensation, polycondensation) is obtainable by dissolving the resin in a solvent, dispersing the resulting resin solution in an aqueous medium in the presence of a dispersant, and removing the solvent by application of heat and/or reduction of pressure.

(h) An aqueous dispersion of a resin produced by a polymerization reaction (e.g., addition polymerization, ring-opening polymerization, polyaddition, addition condensation, polycondensation) is obtainable by dissolving the resin in a solvent, dissolving an emulsifier in the resulting resin solution, and adding water thereto to cause phase-transfer emulsification.

The aqueous medium may further contain a surfactant to reliably disperse the toner constituent liquid. Specific examples of usable surfactants include, but are not limited to, anionic surfactants such as alkylbenzene sulfonates, α-olefin sulfonates and phosphates; cationic surfactants such as amine salt type surfactants (e.g., alkylamine salts, amino alcohol fatty acid derivatives, polyamine fatty acid derivatives, imidazoline) and quaternary ammonium salt type surfactants (e.g., alkyl trimethyl ammonium salts, dialkyl dimethyl ammonium salts, alkyl dimethyl benzyl ammonium salts, pyridinium salts, alkyl isoquinolinium salts, and benzethonium chloride); nonionic surfactants such as fatty acid amide derivatives and polyvalent alcohol derivatives; and ampholytic surfactants such as alanine, dodecylbis(aminoethyl)glycine, bis(octylaminoethyl)glycine, and N-alkyl-N,N-dimethyl ammonium betaine.

Surfactants having a fluoroalkyl group can achieve an effect in a small amount. Specific examples of usable anionic surfactants having a fluoroalkyl group include, but are not limited to, fluoroalkyl carboxylic acids having 2 to 10 carbon atoms and metal salts thereof, perfluorooctane sulfonyl glutamic acid disodium, 3-[ω-fluoroalkyl(C6-C11)oxy]-1-alkyl(C3-C4) sulfonic acid sodium, 3-[ω-fluoroalkanoyl(C6-C8)-N-ethylamino]-1-propane sulfonic acid sodium, fluoroalkyl(C11-C20) carboxylic acids and metal salts thereof, perfluoroalkyl(C7-C13) carboxylic acids and metal salts thereof, perfluoroalkyl(C4-C12) sulfonic acids and metal salts thereof, perfluorooctane sulfonic acid diethanol amide, N-propyl-N-(2-hydroxyethyl)perfluorooctane sulfonamide, perfluoroalkyl(C6-C10) sulfonamide propyl trimethyl ammonium salts, perfluoroalkyl(C6-C10)-N-ethyl sulfonyl glycine salts, and monoperfluoroalkyl(C6-C16) ethyl phosphates. Specific examples of usable cationic surfactants having a fluoroalkyl group include, but are not limited to, aliphatic primary, secondary, and tertiary amine acids having a fluoroalkyl group, aliphatic quaternary ammonium salts such as perfluoroalkyl(C6-C10) sulfonamide propyl trimethyl ammonium salts, benzalkonium salts, benzethonium chlorides, pyridinium salts, and imidazolinium salts.

The aqueous medium may further contain a polymeric protection colloid to stabilize dispersing liquid droplets. Specific examples of usable polymeric protection colloids include, but are not limited to, homopolymers and copolymers obtained from monomers, such as acids (e.g., acrylic acid, methacrylic acid, α-cyanoacrylic acid, α-cyanomethacrylic acid, itaconic acid, crotonic acid, fumaric acid, maleic acid, maleic anhydride), hydroxyl-group-containing acrylates and methacrylates (e.g., β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethylene glycol monoacrylate, diethylene glycol monomethacrylate, glycerin monoacrylate, glycerin monomethacrylate), vinyl alcohols and vinyl alcohol ethers (e.g., vinyl methyl ether, vinyl ethyl ether, vinyl propyl ether), esters of vinyl alcohols with carboxyl-group-containing compounds (e.g., vinyl acetate, vinyl propionate, vinyl butyrate), amides (e.g., acrylamide, methacrylamide, diacetone acrylamide) and methylol compounds thereof (e.g., N-methylol acrylamide, N-methylol methacrylamide), acid chlorides (e.g., acrylic acid chloride, methacrylic acid chloride), and monomers containing nitrogen or a nitrogen-containing heterocyclic ring (e.g., vinyl pyridine, vinyl pyrrolidone, vinyl imidazole, ethylene imine); polyoxyethylenes (e.g., polyoxyethylene, polyoxypropylene, polyoxyethylene alkylamine, polyoxypropylene alkylamine, polyoxyethylene alkylamide, polyoxypropylene alkylamide, polyoxyethylene nonyl phenyl ether, polyoxyethylene lauryl phenyl ether, polyoxyethylene stearyl phenyl ester, polyoxyethylene nonyl phenyl ester); and celluloses (e.g., methyl cellulose, hydroxyethyl cellulose, hydroxypropyl cellulose).

In a case in which a dispersant soluble in acids and bases (e.g., calcium phosphate) is used, the resulting mother particles may be first washed with an acid (e.g., hydrochloric acid) and then washed with water to remove the dispersant. Alternatively, such a dispersant can be removed with an enzyme. Dispersants may either keep remaining on the surface of the mother particle or be removed from the surface of the mother particle in terms of chargeability.

The toner constituent liquid is dispersed in the aqueous medium using a low-speed shearing disperser, a high-speed shearing disperser, a frictional disperser, a high-pressure jet disperser, or an ultrasonic disperser, for example. In some embodiments, a high-speed shearing disperser is used to make the dispersing liquid droplets have an average particle diameter of 2 to 20 μm. In such embodiments, the high-speed shearing disperser operates at a revolution of 1,000 to 30,000 rpm or 5,000 to 20,000 rpm. The dispersing time may be 0.1 to 5 minutes for a batch type. The dispersing temperature may be 0 to 150° C. (under pressure) or 20 to 80° C.

The solvent can be removed from the resulting emulsion by gradually heating the emulsion under normal or reduced pressures to completely evaporate the solvent from liquid droplets. Alternatively, the solvent can be removed from the emulsion by spraying the emulsion into dry atmosphere to completely evaporate the solvent from liquid droplets. In this case, the surfactant can also be evaporated. The dry atmosphere into which the emulsion is sprayed may be, for example, air, nitrogen gas, carbon dioxide gas, or combustion gas, which is heated to above the boiling point of the solvent. Such a treatment can be reliably performed by a spray drier, a belt drier, or a rotary kiln, within a short period of time.

The amine (B) may be previously mixed with the toner constituent liquid before the toner constituent liquid is added to the aqueous medium. Alternatively, the amine (B) may be added to the aqueous medium after the toner constituent liquid is dispersed therein. The reaction time between the prepolymer (A) and the amine (B) may be 1 minute to 40 hours or 1 to 24 hours. The reaction temperature may be 0 to 150° C. or 20 to 98° C. A catalyst can be used, if needed.

The mother particle dispersed in the aqueous medium may be washed and dried out by any known procedure. For example, one procedure includes subjecting the emulsion to solid-liquid separation by centrifugal separation or filter press to obtain a toner cake, redispersing the toner cake in ion-exchange water having a normal temperature to a temperature around 40° C., optionally controlling the pH by addition of an acid or an alkaline, and subjecting the dispersion to solid-liquid separation again. This procedure is repeated for several times. Thus, impurities and surfactants are removed in the above procedure. The mother particle is then dried out by a flash drier, a circulating drier, a reduced-pressure drier, or a vibrating fluidizing drier. Undesired fine particles may be removed in the process of centrifugal separation. The dried mother particle may be subjected to classification by a classifier to collect particles having a desired particle diameter distribution.

In accordance with some embodiments, the toner can be used for either one-component developer consisting of the toner or two-component developer consisting of the toner and a carrier.

External additives, which may give fluidity, storage stability, developability, and transferability, may be mixed with the mother particle by a typical powder mixer which may be equipped with a jacket that controls the inner temperature. To vary load history given to the external additive, the external additive may be gradually added or added from the middle of the mixing, while optionally varying the revolution, rotating speed, time, and temperature in the mixing. The load may be initially strong and gradually weaken, or vice versa. Specific usable mixers include, but are not limited to, a V-type mixer, a Rocking mixer, a Loedige mixer, a Nauta mixer, and a Henschel mixer.

In accordance with some embodiments, a one-component developer consisting of the toner according to an embodiment and a two-component developer consisting of the toner according to an embodiment and a carrier are provided. The two-component developer may be used for high-speed printers in accordance with recent improvement in information processing speed because of having a long lifespan. In some embodiments, the two-component developer includes the toner in an amount of 1 to 10 parts by weight based on 100 parts by weight of the carrier.

In the one-component developer according to an embodiment, the average toner particle size may not vary very much although consumption and supply of the toner particles are repeated. Additionally, the toner particles may not adhere or fix to a developing roller or a toner layer regulating blade. Thus, the one-component developer reliably provides stable developability and image quality for an extended period of time. In the two-component developer according to an embodiment, the average toner particle size may not vary very much although consumption and supply of the toner particles are repeated. Thus, the two-component developer reliably provides stable developability for an extended period of time.

The carrier particle may comprise a core material and a resin layer that covers the core material.

Specific examples of usable core materials include, but are not limited to, manganese-strontium (Mn—Sr) and manganese-magnesium (Mn—Mg) materials having a magnetization of 50 to 90 emu/g. High magnetization materials such as iron powders having a magnetization of 100 emu/g or more and magnetites having a magnetization of 75 to 120 emu/g are suitable for improving image density. Additionally, low magnetization materials such as copper-zinc (Cu—Zn) materials having a magnetization of 30 to 80 emu/g are suitable for producing a high-quality image, because carrier particles made of such materials can weakly contact a photoreceptor. Two or more of these materials can be used in combination.

In some embodiments, the core material has a weight average particle diameter within a range of 10 to 200 µm or 40 to 100 µm. When the weight average particle diameter is less than 10 µm, it means that the resulting carrier particles include a relatively large amount of fine particles, and therefore the magnetization per carrier particle is too low to prevent carrier particles scattering. When the weight average particle diameter is greater than 200 µm, it means that the specific surface area of the carrier particle is too small to prevent toner particles from scattering. Therefore, solid portions in full-color images may not be reliably reproduced.

Specific examples of usable resins for the resin layer include, but are not limited to, amino resins, polyvinyl resins, polystyrene resins, halogenated olefin resins, polyester resins, polycarbonate resins, polyethylene resins, polyvinyl fluoride resins, polyvinylidene fluoride resins, poly(trifluoroethylene) resins, poly(hexafluoropropylene) resins, vinylidene fluoride-acrylic monomer copolymer, vinylidene fluoride-vinyl fluoride copolymer, tetrafluoroethylene-vinylidene fluoride-non-fluoride monomer terpolymer, and silicone resins. Two or more of these resins can be used in combination.

Specific examples of the amino resins include, but are not limited to, urea-formaldehyde resin, melamine resin, benzoguanamine resin, urea resin, polyamide resin, and epoxy resin. Specific examples of the polyvinyl resins include, but are not limited to, acrylic resin, polymethyl methacrylate, polyacrylonitrile, polyvinyl chloride, polyvinyl alcohol, and polyvinyl butyral. Specific examples of the polystyrene resins include, but are not limited to, polystyrene and styrene-acrylic copolymer. Specific examples of the halogenated olefin resins include, but are not limited to, polyvinyl chloride. Specific examples of the polyester resins include, but are not limited to, polyethylene terephthalate and polybutylene terephthalate.

The resin layer may contain a conductive powder. Specific examples of usable conductive powders include, but are not limited to, metal, carbon black, titanium oxide, tin oxide, and zinc oxide. In some embodiments, the conductive powder has an average particle diameter of 1 µm or less. When the average particle diameter is greater than 1 µm, it may be difficult to control electric resistivity of the resin layer.

The resin layer can be formed by, for example, dissolving a resin (e.g., a silicone resin) in a solvent to prepare a coating liquid, and uniformly applying the coating liquid on the surface of the core material, followed by drying and baking. The coating method may be, for example, dip coating, spray coating, or brush coating.

Specific examples of usable solvents include, but are not limited to, toluene, xylene, methyl ethyl ketone, methyl isobutyl ketone, methyl cellosolve, and butyl acetate.

The baking method may be either an external heating method or an internal heating method that uses a stationary electric furnace, a fluid electric furnace, a rotary electric furnace, a burner furnace, or microwave.

In some embodiments, the content of the resin layer in the carrier particle is 0.01 to 5.0% by weight. When the content of the resin layer is less than 0.01% by weight, it means that the resin layer cannot be uniformly formed on the core material.

When the content of the resin layer is greater than 5.0% by weight, it means that the resin layer is so thick that each carrier particles may be fused with each other.

An image forming apparatus according to an embodiment includes: a latent image bearing member adapted to bear an electrostatic latent image; a charger adapted to charge a surface of the latent image bearing member; an irradiator adapted to irradiate the charged surface of the latent image bearing member to form an electrostatic latent image thereon; a developing device adapted to develop the electrostatic latent image into a toner image with the toner according to an embodiment; and a transfer device adapted to transfer the toner image onto a transfer material.

The image forming apparatus may employ any electrophotographic methods, such as magnetic one-component developing methods, non-magnetic one-component developing methods, and two-component developing methods.

An image forming apparatus according to an embodiment includes at least a latent image bearing member, a charger, an irradiator, a developing device, and a transfer device, and optionally includes other members such as a fixing device, a neutralizer, a cleaner, a recycler, and a controller, if needed.

The image forming apparatus practices an image forming method including at least an electrostatic latent image forming process, a developing process, and a transfer process, and optionally includes other processes such as a fixing process, a neutralization process, a cleaning process, a recycle process, and a control process, if needed.

Figure 1:
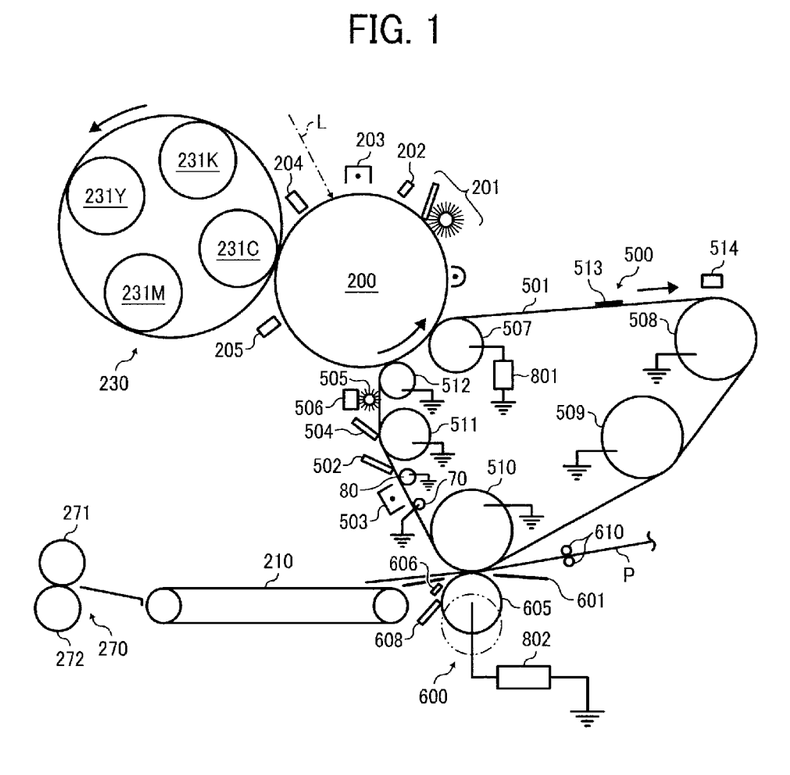
FIG. 1 is a schematic view of an image forming apparatus according to an embodiment.

FIG. 1 is a schematic view of an image forming apparatus according to an embodiment.

An intermediate transfer unit 500 includes an intermediate transfer belt 501 stretched taut with multiple rollers. A secondary transfer unit 600, a secondary transfer bias roller 605, a belt cleaning blade 504, and a lubricant application brush 505 are disposed facing the intermediate transfer belt 501.

Position detection marks are provided on the outer or inner peripheral surface of the intermediate transfer belt 501. Position detection marks should be provided keeping away from the area on the outer peripheral surface of the intermediate transfer belt 501 where the belt cleaning blade 504 passes by. If it is difficult, position detection marks are provided on the inner peripheral surface of the intermediate transfer belt 501.

An optical sensor 514 that detects the marks is disposed facing a part of the intermediate transfer belt 501 stretched between a primary transfer bias roller 507 and a belt driving roller 508. The optical sensor 514 detects position by detecting light reflected from the intermediate transfer belt 501.

The intermediate transfer belt 501 is stretched across the primary transfer bias roller 507, the belt driving roller 508, a belt tension roller 509, a secondary transfer facing roller 510, a cleaning facing roller 511, and a feedback current detection roller 512. Each of these roller is comprised of conductive materials. These rollers other than the primary transfer bias roller 507 are grounded. The primary transfer bias roller 507 is supplied with a transfer bias from a primary transfer power source 801 that is constant-current-controlled or constant-voltage-controlled. The transfer bias has predetermined current and voltage that are controlled according to the number of toner images to be superimposed on one another.

The intermediate transfer belt 501 is driven to rotate in a direction indicated by arrow in FIG. 1 by the belt driving roller 508 that is driven to rotate by a driving motor. The intermediate transfer belt 501 is comprised of a semiconductor or insulator and has a single-layered or multilayered structure. Toner images formed on a photoreceptor drum 200 are superimposed on one another on the intermediate transfer belt 501. Therefore, the size of the photoreceptor drum 200 is set greater than the maximum size of usable paper.

The secondary transfer bias roller 605 is disposed facing a part of the outer peripheral surface of the intermediate transfer belt 501 where the secondary transfer facing roller 510 is pressed against. The secondary transfer bias roller 605 can be brought into contact with or drawn away from the outer peripheral surface of the intermediate transfer belt 501. A transfer paper P is to be sandwiched between the secondary transfer bias roller 605 and the part of the intermediate transfer belt 501 where the secondary transfer facing roller 510 is pressed against. The secondary transfer bias roller 605 is supplied with a transfer bias having a predetermined current from a secondary transfer power source 802 that is constant-current-controlled.

A registration roller 610 feeds a transfer paper P to a gap between the secondary transfer bias roller 605 and the part of the intermediate transfer belt 501 where the secondary transfer facing roller 510 is pressed against in synchronization with an entry of a toner image to the gap. A cleaning blade 608 is disposed in contact with the secondary transfer bias roller 605. The cleaning blade 608 is adapted to remove incrustations from the secondary transfer bias roller 605.

In an image forming operation, the photoreceptor drum 200 is driven to rotate counterclockwise in FIG. 1 by a driving motor. The photoreceptor drum 200 is then charged by a charger 203 and irradiated with light L so that toner images of black, cyan, magenta, and yellow are formed thereon. The intermediate transfer belt 501 is driven to rotate in a direction indicated by arrow in FIG. 1 by the belt driving roller 508. While the intermediate transfer belt 501 is rotating, the primary transfer bias roller 507 is supplied with a transfer bias and the toner images of black, cyan, magenta, and yellow are primarily transferred onto the intermediate transfer belt 501 in this order. Thus, a composite toner image in which the toner images of black, cyan, magenta, and yellow are superimposed on one another is formed on the intermediate transfer belt 501.

A black toner image is formed as follows. First, the charger 203 uniformly charges a surface of the photoreceptor drum 200 to a predetermined negative potential by corona discharge. An optical writing unit then irradiates the charged surface of the photoreceptor drum 200 with laser light L based on black image signal in synchronized timing with detection of the marks. Within a part of the surface of the photoreceptor drum 200 which has been exposed to the irradiation light, an amount of charge has disappeared in proportion to the amount of the irradiation light. As a result, an electrostatic latent image of the black image ("black electrostatic latent image") is formed. In a black developing device 231K, negatively-charged black toner particles are carried by a developing roller and are brought into contact with the photoreceptor drum 200. The toner particles are selectively adsorbed to the area where no charge is remaining, i.e., the black electrostatic latent image, without being adsorbed to the other areas where charge is still remaining. As a result, a black toner image is formed.

The black toner image is then primarily transferred from the photoreceptor drum 200 onto a peripheral surface of the intermediate transfer belt 501 that is rotating at a constant speed while contacting the photoreceptor drum 200. Residual toner particles remaining on the photoreceptor drum 200 without being transferred onto the intermediate transfer belt 501 are collected by a photoreceptor cleaner 201 to be recycled. On the other hand, reading of cyan image data is timely started and the photoreceptor drum 200 is irradiated with laser light L based on the cyan image data. As a result, a cyan electrostatic latent image is formed on the surface of the photoreceptor drum 200.

After the trailing edge of the black electrostatic latent image passes by and before the leading edge of the cyan electrostatic latent image reaches the developing area where the photoreceptor drum 200 is facing the revolver developing unit 230, a revolver developing unit 230 rotates so that a cyan developing device 231C enters the developing area. After the trailing edge of the cyan electrostatic latent image passes by and before the leading edge of the next magenta electrostatic latent image reaches the developing area, the revolver developing unit 230 rotates so that a magenta developing device 231M enters the developing area. Magenta and yellow toner images are formed in the same manner as the black and cyan toner images are formed.

The toner images of black, cyan, magenta, and yellow thus sequentially formed on the photoreceptor drum 200 are sequentially transferred onto the same position on the intermediate transfer belt 501. As a result, a composite toner image in which up to four toner images are superimposed on one another is formed on the intermediate transfer belt 501. At the time the image forming operation is started, a paper feed part feeds a transfer paper P to a nip of the registration roller 610.

The registration roller 610 is driven to feed the transfer paper P along a transfer paper guide plate 601 toward a secondary transfer nip that is formed between the secondary transfer bias roller 605 and the part of the intermediate transfer belt 501 where the secondary transfer facing roller 510 is pressed against in synchronization with an entry of the composite toner image thereto so that the leading edge of the transfer paper P coincides with that of the composite toner image.

In the secondary transfer nip, the composite toner image is secondarily transferred from the intermediate transfer belt 501 onto the transfer paper P by a transfer bias supplied to the secondary transfer bias roller 605 from the secondary transfer power source 802.

The transfer paper P is then conveyed downstream from the secondary transfer nip toward a transfer paper neutralizing charger 606, equipped with a neutralization rod, along the transfer paper guide plate 601. After being neutralized, the transfer paper P is conveyed toward a fixing device 270 by a belt conveyer 210. In a nip formed between fixing rollers 271 and 272 in the fixing device 270, the composite toner image is melted and fixed on the transfer paper P. The transfer paper P having the fixed composite toner image thereon is ejected from the apparatus by an ejection roller and stacked on a copy receiving tray face up. The fixing device 270 may employ belt-like fixing members in place of the fixing rollers.

On the other hand, after the toner images are transferred from the photoreceptor drum 200, the surface of the photoreceptor drum 200 is cleaned by the photoreceptor cleaner 201 and then uniformly neutralized by a neutralization lamp 202. Residual toner particles remaining on the peripheral surface of the intermediate transfer belt 501 without being transferred onto the transfer paper P are removed by the belt cleaning blade 504. The belt cleaning blade 504 can be timely brought into contact with or drawn away from the outer peripheral surface of the intermediate transfer belt 501 by a cleaning member moving device.

A toner seal member 502 is disposed upstream from the belt cleaning blade 504 relative to the direction of movement of the intermediate transfer belt 501. The toner seal member 502 can be brought into contact with or drawn away from the outer peripheral surface of the intermediate transfer belt 501. The toner seal member 502 is adapted to receive residual toner particles fallen from the belt cleaning blade 504 during cleaning of the intermediate transfer belt 501 and to prevent them from scattering on the conveyance path of the transfer paper P. The toner seal member 502 can be timely brought into contact with or drawn away from the outer peripheral surface of the intermediate transfer belt 501 by the cleaning member moving device together with the belt cleaning blade 504.

After residual toner particles are removed from the outer peripheral surface of the intermediate transfer belt 501, the lubricant application brush 505 applies fine grains of a lubricant 506 thereto. The lubricant 506 is comprised of a solid block of, for example, zinc stearate. The lubricant 506 is disposed in contact with the lubricant application brush 505. This lubricant application mechanism is for reliably keeping transfer and cleaning performance of the intermediate transfer belt 501 but is not essential. Residual charge remaining on the outer peripheral surface of the intermediate transfer belt 501 is neutralized by a neutralization bias supplied from a belt neutralization brush that is disposed in contact with the outer peripheral surface of the intermediate transfer belt 501. The lubricant application brush 505 and the belt neutralization brush can be timely brought into contact with or drawn away from the outer peripheral surface of the intermediate transfer belt 501 by a moving device.

When a copying operation is repeated, on the photoreceptor drum 200, formation of the fourth color image (i.e., yellow image) to be formed on the first sheet is followed by formation of the first color image (i.e., black image) to be formed on the second sheet. Secondary transfer of a composite toner image from the intermediate transfer belt 501 onto the first sheet is followed by primary transfer of the first color toner image (i.e., black toner image) to be formed on the second sheet onto a part of the peripheral surface of the intermediate transfer belt 501 which has been cleaned by the belt cleaning blade 504. Thereafter, the procedure for forming the composite toner image on the first sheet is repeated. The above procedure is for forming four-color image and three-color or two-color images can also be formed in a similar manner. In a single-color copying operation, only the designated developing device in the revolver developing unit 230 is brought into operation and the belt cleaning blade 504 is brought into contact with the intermediate transfer belt 501 until a predetermined number of copies are produced.

In FIG. 1, a numeral 70 denotes a neutralization roller, a numeral 80 denotes a grounded roller, a numeral 204 denotes a potential sensor, a numeral 205 denotes a toner image density sensor, a numeral 503 denotes a charger, and a numeral 513 denotes a toner image.

A process cartridge according to an embodiment integrally supports at least a latent image bearing member on which an electrostatic latent image is formed and a developing device that develops the electrostatic latent image into a toner image with the developer according to an embodiment. The process cartridge is detachably attachable to image forming apparatuses. The process cartridge may further include other devices.

Figure 2:
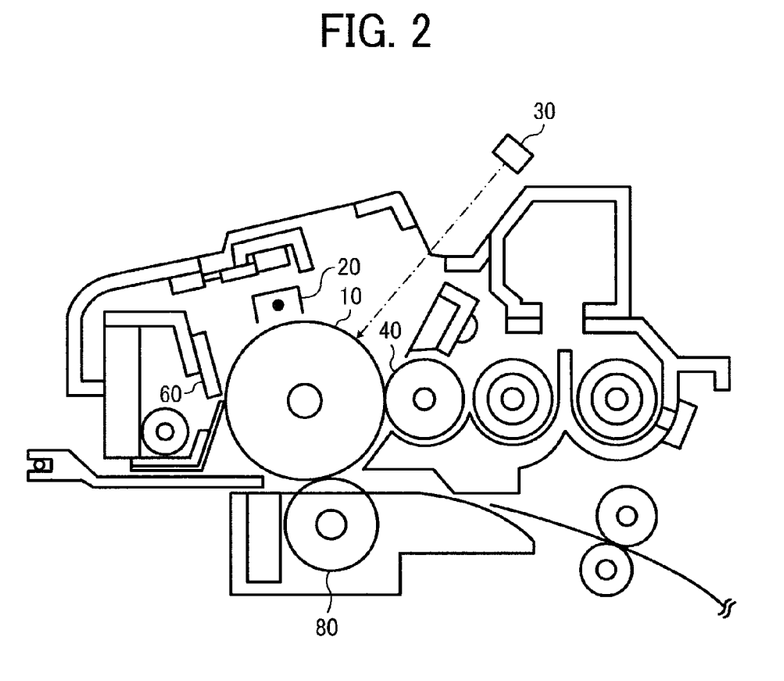
FIG. 2 is a schematic view of a process cartridge according to an embodiment.

FIG. 2 is a schematic view of a process cartridge according to an embodiment. The process cartridge includes a photoreceptor 10 serving as the latent image bearing member, a charger 20, an irradiator 30, a developing device 40, a cleaning device 60, and a transfer device 80.

In the process of forming an electrostatic latent image, an electrostatic latent image is formed on a photoreceptor. A charger uniformly charges a surface of the photoreceptor by supplying a voltage to the surface and an irradiator irradiates the charged surface with light containing image information.

The photoreceptor is not limited in material, shape, structure, or size. In some embodiments, the photoreceptor has a drum-like shape. The photoreceptor may be comprised of an inorganic photoconductor, such as amorphous silicone and selenium, or an organic photoconductor, such as polysilane and phthalopolymethyne. In some embodiments, amorphous silicone is used because of having a long lifespan. The charger may be, for example, either a contact charger equipped with a conductive or semiconductive roll, brush, film, or rubber blade, or a non-contact charger such as corotron and scorotron that use corona discharge. The charger is disposed either contacting or non-contacting the photoreceptor. In some embodiments, the charger charges a surface of the photoreceptor by being supplied with a direct current voltage overlapped with an alternating current voltage. In some embodiments, the charger is a non-contact charging roller disposed proximal to the photoreceptor which charges a surface of the photoreceptor by being supplied with a direct current voltage overlapped with an alternating current voltage.

The irradiator may be, for example, a radiation optical type, a rod lens array type, a laser optical type, or a liquid crystal shutter optical type. The photoreceptor may be irradiated with light from the reverse surface (back surface) side thereof.

In the process of developing, the electrostatic latent image is developed into a toner image that is visible with the developer according to an embodiment.

In some embodiments, the developing device includes a container that contains the developer according to an embodiment and a developer bearing member that supplies the developer to the electrostatic latent image with or without contacting the electrostatic latent image. The developing device may employ either a dry developing method or a wet developing method. The developing device may be either a single-color developing device or a multi-color developing device. The developing device may be comprised of an agitator that frictionally agitates and charges the developer, and a rotatable magnet roller. In the developing device, toner particles and carrier particles are mixed and agitated so that the toner particles are frictionally charged. The charged toner particles and carrier particles are borne on the surface of the magnet roller forming chainlike aggregations (hereinafter "magnetic brush"). The magnet roller is disposed adjacent to the photoreceptor. Therefore, a part of the toner particles in the magnetic brush migrates from the surface of the magnet roller to the surface of the photoreceptor due to electrical attractive force. As a result, the electrostatic latent image formed on the photoreceptor is developed into a toner image. During migration of the toner particles to the surface of the photoreceptor, an alternation electric field may be applied.

In the process of transfer, the toner image is transferred from the photoreceptor onto a recording medium. In some embodiments, the toner image is primarily transferred from the photoreceptor onto an intermediate transfer medium, and secondarily transferred from the intermediate transfer medium onto the recording medium. In such embodiments, multiple toner images with different colors are primarily transferred from the respective photoreceptors onto the intermediate transfer medium to form a composite toner image, and the composite toner image is secondarily transferred from the intermediate transfer medium onto the recording medium. The toner image can be transferred from the photoreceptor upon charging the photoreceptor by a transfer charger.

In some embodiments, the transfer device includes a primary transfer device that transfers toner images from the respective photoreceptors onto the intermediate transfer medium to form a composite toner image, and a secondary transfer device that transfers the composite toner image from the intermediate transfer medium onto a recording medium. In such embodiments, the transfer device (including the primary transfer device and the secondary transfer device) contains a transfer unit that separates a toner image from the photoreceptor toward a recording medium side. The number of the transfer device may be one or more. The transfer unit may be, for example, a corona discharger, a transfer belt, a transfer roller, a pressure transfer roller, or an adhesive transfer unit.

The intermediate transfer medium may be, for example, a transfer belt. The recording medium is not limited to a specific material, and any kind of material can be used as the recording medium.

In the process of fixing, the fixing device fixes the toner image on a recording medium. Each single-color toner image may be independently fixed on a recording medium. Alternatively, a composite toner image including multiple color toner images may be fixed on a recording medium at once.

In some embodiments, the fixing device includes fixing members that fix a toner image by application of heat and pressure. The fixing members may have either a roller-like or belt-like shape. For example, the fixing device may include a combination of a heating roller and a pressing roller, or a combination of a heating roller, a pressing roller, and an endless belt. The heating temperature may be 80 to 200° C.

In some embodiments, the fixing device includes a heater equipped with a heating element, a film in contact with the heater, and a pressing member that presses against the heater with the film therebetween. a recording medium having a toner image thereon is passed through between the film and the pressing member so that the toner image is fixed on the recording medium by application of heat and pressure. In the fixing process, an optical fixer can be used in place of or in combination with the fixing device. In the process of neutralization, the neutralizer neutralizes the photoreceptor by applying a neutralization bias thereto. The neutralizer may be, for example, a neutralization lamp.

In the process of cleaning, the cleaner removes residual toner particles remaining on the photoreceptor. The cleaner may be, for example, a magnetic brush cleaner, an electrostatic brush cleaner, a magnetic roller cleaner, a blade cleaner, a brush cleaner, or a web cleaner.

In the process of recycle, the recycler supplies the residual toner particles collected in the cleaning process to the developing device. The recycler may be, for example, a conveyer.

In the process of control, the controller controls the above-described processes. The controller may be, for example, a sequencer or a computer.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Preparation of Mother Particle by Emulsification Method
Preparation of Resin Particle Dispersion Charge a reaction vessel equipped with a stirrer and a thermometer with 683 parts of water, 11 parts of a sodium salt of a sulfate of ethylene oxide adduct of methacrylic acid (ELEMINOL RS-30 from Sanyo Chemical Industries, Ltd.), 83 parts of styrene, 83 parts of methacrylic acid, 10 parts of butyl acrylate, and 1 part of ammonium persulfate. Agitate the mixture for 15 minutes at a revolution of 400 rpm. Thus, an emulsion that is white is prepared. Heat the emulsion to 75° C. and subject it to a reaction for 5 hours. Further add 30 parts of a 1% aqueous solution of ammonium persulfate to the emulsion, and age the mixture for 5 hours at 75° C. Thus, a resin particle dispersion 1 that is an aqueous dispersion of a vinyl resin (i.e., a copolymer of styrene, methacrylic acid, butyl acrylate, and a sodium salt of a sulfate of ethylene oxide adduct of methacrylic acid) is prepared. Subject the resin particle dispersion 1 to a measurement by a laser diffraction particle size distribution analyzer LA-920 (from Horiba, Ltd.). The weight average particle diameter of the resin particle dispersion 1 is 105 nm. Dry out a part of the resin particle dispersion 1 to isolate the resin therefrom. The isolated resin has a glass transition temperature (Tg) of 59° C. and a weight average molecular weight of 150,000.

Preparation of Aqueous Phase

Mix 990 parts of water, 83 parts of the resin particle dispersion 1, 37 parts of a 48.5% aqueous solution of dodecyl diphenyl ether sodium disulfonate (ELEMINOL MON-7 from Sanyo Chemical Industries, Ltd.), and 90 parts of ethyl acetate. Thus, an aqueous phase 1 that is a milky whitish liquid is prepared.

Preparation of Low-molecular-weight Polyester

Charge a reaction vessel equipped with a condenser, a stirrer, and a nitrogen inlet pipe with 229 parts of ethylene oxide 2 mol adduct of bisphenol A, 529 parts of propylene oxide 3 mol adduct of bisphenol A, 208 parts of terephthalic acid, 46 parts of adipic acid, and 2 parts of dibutyltin oxide. Subject the mixture to a reaction for 8 hours at 230° C. under normal pressure and subsequent 5 hours under reduced pressures of 10 to 15 mmHg. After adding 44 parts of trimellitic anhydride, further subject the mixture to a reaction for 2 hours at 180° C. under normal pressure. Thus, a low-molecular-weight polyester 1 is prepared. The low-molecular-weight polyester 1 has a number average molecular weight of 2,500, a weight average molecular weight of 6,700, a glass transition temperature (Tg) of 43° C., and an acid value of 25 mgKOH/g.

Preparation of Intermediate Polyester and Prepolymer

Charge a reaction vessel equipped with a condenser, a stirrer, and a nitrogen inlet pipe with 682 parts of ethylene oxide 2 mol adduct of bisphenol A, 81 parts of propylene oxide 2 mol adduct of bisphenol A, 283 parts of terephthalic acid, 22 parts of trimellitic anhydride, and 2 parts of dibutyltin oxide. Subject the mixture to a reaction for 8 hours at 230° C. under normal pressure and subsequent 5 hours under reduced pressures of 10 to 15 mmHg. Thus, an intermediate polyester 1 is prepared. The intermediate polyester 1 has a number average molecular weight of 2,100, a weight average molecular weight of 9,500, a glass transition temperature (Tg) of 55° C., an acid value of 0.5 mgKOH/g, and a hydroxyl value of 51 mgKOH/g.

Charge another reaction vessel equipped with a condenser, a stirrer, and a nitrogen inlet pipe with 410 parts of the intermediate polyester 1, 89 parts of isophorone diisocyanate, and 500 parts of ethyl acetate. Subject the mixture to a reaction for 5 hours at 100° C. Thus, a prepolymer 1 is prepared. The prepolymer 1 includes 1.53% of free isocyanates.

Preparation of Ketimine Compound

Charge a reaction vessel equipped with a stirrer and a thermometer with 170 parts of isophoronediamine and 75 parts of methyl ethyl ketone. Subject the mixture to a reaction for 5 hours at 50° C. Thus, a ketimine compound 1 is prepared. The ketimine compound 1 has an amine value of 418 mgKOH/g.

Preparation of Master Batch

Mix 35 parts of water, 40 parts of a phthalocyanine pigment FG7351 (from Toyo Ink Co., Ltd.), and 60 parts of a polyester resin RS301 (from Sanyo Chemical Industries, Ltd.) by a HENSCHEL MIXER (from Mitsui Mining and Smelting Co., Ltd.). Knead the resulting mixture by a double roll for 30 minutes at 150° C. Roll and cool the kneaded mixture and pulverize the rolled mixture into particles by a pulverizer. Thus, a master batch 1 is prepared.

Preparation of Colorant Dispersion

Charge a reaction vessel equipped with a stirrer and a thermometer with 378 parts of the low-molecular-weight polyester 1, 110 parts of a carnauba wax, 22 parts of a charge controlling agent (a salicylic acid metal complex E-84 from Orient Chemical Industries Co., Ltd.), and 947 parts of ethyl acetate. Heat the mixture to 80° C. while agitating it, keep it at 80° C. for 5 hours, and cool it to 30° C. over a period of 1 hour. Further mix 500 parts of the master batch 1 and 500 parts of ethyl acetate in the mixture for 1 hour.

Thereafter, subject 1,324 parts of the resulting mixture to a dispersion treatment using a bead mill (ULTRAVISCOMILL (trademark) from Aimex Co., Ltd.) filled with 80% by volume of zirconia beads having a diameter of 0.5 mm, at a liquid feeding speed of 1 kg/hour, and a disc peripheral speed of 6 msec. Repeat this dispersing operation 3 times (3 passes) to disperse the wax and the phthalocyanine pigment. After adding 1,324 parts of a 65% ethyl acetate solution of the low-molecular-weight polyester 1, further subject the resulting mixture to the above dispersing operation for 1 time (1 pass). Thus, a colorant/wax dispersion 1 having a solid content of 50% (when measured at 130° C. for 30 minutes) is prepared.

Emulsification

Mix 648 parts of the colorant/wax dispersion 1, 154 parts of the prepolymer 1, and 6.6 parts of the ketimine compound 1 by a TK HOMOMIXER (from Primix Corporation) at a revolution of 5,000 rpm for 1 minute. Further mix 1,200 parts of the aqueous phase 1 therein by the TK HOMOMIXER at a revolution of 13,000 rpm for 20 minutes. Thus, an emulsion slurry 1 is obtained.

Shape Control

Gradually add 3.15 parts of SEROGEN BS-H (from Dai-ichi Kogyo Seiyaku Co., Ltd.) to 75.6 parts of ion-exchange water being agitated by a TK HOMOMIXER (from Primix Corporation) at a revolution of 2,000 rpm, followed by agitation for 30 minutes at 20° C. Mix the resulting SEROGEN solution with 43.3 parts of a 48.5% aqueous solution of dodecyl diphenyl ether sodium disulfonate (ELEMINOL MON-7 from Sanyo Chemical Industries, Ltd.), followed by agitation for 5 minutes at 20° C. Mix 2,000 parts of the emulsion slurry 1 therein by a TK HOMOMIXER at a revolution of 2,000 rpm for 1 hour. Thus, a shape control slurry 1 is prepared.

Solvent Removal

Heat the shape control slurry 1, contained in a vessel equipped with a stirrer and a thermometer, at 30° C. for 8 hours to remove the organic solvent and then heat at 45° C. for 4 hours to be aged. Thus, a dispersion slurry 1 is prepared.

Washing and Drying

Filter 100 parts of the dispersion slurry 1 under reduced pressure and then mix with 100 parts of ion-exchange water by a TK HOMOMIXER at a revolution of 12,000 rpm for 10 minutes, followed by filtering. Thus a wet cake (1) is obtained. Mix the wet cake (1) with 100 parts of a 10% aqueous solution of sodium hydroxide by a TK HOMOMIXER at a revolution of 12,000 rpm for 30 minutes, followed by filtering under reduced pressure. Thus, a wet cake (2) is obtained. Mix the wet cake (2) with 100 parts of a 10% hydrochloric acid by a TK HOMOMIXER at a revolution of 12,000 rpm for 10 minutes, followed by filtering. Thus a wet cake (3) is obtained. Mix the wet cake (3) with 300 parts of ion-exchange water by a TK HOMOMIXER at a revolution of 12,000 rpm for 10 minutes, followed by filtering. Repeat this operation twice. Thus, a filtered cake 1 is obtained.

Dry the filtered cake 1 by a drier at 45° C. for 48 hours and then sieved it with a mesh having openings of 75 µm. Thus, a mother particle A is prepared.

Preparation of Mother Particle by Pulverization Method

Melt-knead the following materials by an air-cooled double roll mill for 15 minutes: 100 parts of a binder resin (i.e., a polyester resin primarily comprised of ethylene oxide adduct of bisphenol A and terephthalic acid, having a weight average molecular weight of $1.1 \times 10^4$, a number average molecular weight of $3.9 \times 10^3$, a viscosity ($\eta$) of 90 Pa·s at 140° C., and a glass transition temperature (Tg) of 69° C.), 20 parts of a high-melt-viscosity resin (i.e., a terpene-modified novolac resin, having a weight average molecular weight of 2,500, a softening point (Tm) of 165° C., and a viscosity (g) of 85,000 Pa·s at 140° C.), 5 parts of a carbon black (BPL from Cabot Corporation), 2 parts of a charge controlling agent (BONTRON E84 from Orient Chemical Industries Co., Ltd.), 5 parts of a low-molecular-weight polypropylene (VISCOL 660P from Sanyo Chemical industries, Ltd.). Cool the kneaded mixture and pulverize the cooled mixture into fine particles by a jet mill. Classify the fine particles by size by a wind-power classifier. Thus, a mother particle B having a volume average particle diameter of 6 µm is prepared.

Preparation of Particulate α-Cellulose

In this Example, a highly-functional crystalline cellulose PH-F20JP CEOLUS® available from Asahi Kasei Chemicals Corporation, being in the form of pulp having a number average particle diameter of 20 µm obtained from fibrous plants, is employed as the α-cellulose. Subject the α-cellulose to a pulverization treatment by a scramjet pulverizer RM400 (from Tokuju Corporation) to obtain fine particles thereof having number average particle diameters of 13 nm, 21 nm, 35 nm, 59 nm, 90 nm, and 111 nm.

The number average particle diameter of each particulate α-cellulose is measured by obtaining a SEM image of 300 randomly-selected particles by an FE-SEM (S-4200) from Hitachi, Ltd. and analyzing the SEM image with an image analyzer (Luzex AP from Nireco Corporation) through an interface.

Preparation of Carrier

Disperse 200 parts of a silicone resin solution (from Shin-Etsu Chemical Co., Ltd.) and 3 parts of a carbon black (from Cabot Corporation) in toluene to prepare a coating liquid. Apply the coating liquid to 2,500 parts of a ferrite core material by a fluidized-bed spraying method. Bake the ferrite core material thus covered with the coating liquid in an electric furnace for 2 hours at 300° C. Sieve the resulting bulk carrier with a 63-µm mesh and subsequently with a 45-µm mesh. Thus, a carrier particle having an average particle diameter of 35 µm is prepared.

Example 1

Preparation of Toner A

Mix 100 parts of the mother particle A and 1.0 part of the particulate α-cellulose having a number average particle diameter of 21 nm by a HENSCHEL MIXER while setting the peripheral speed of its agitation blades to 20 m/sec. Further mix 0.75 parts of an isobutyl-treated hydrophobized rutile-type titanium oxide (i.e., reacted with a silane compound or silicone oil) having an average particle diameter of 15 nm therein by a HENSCHEL MIXER while setting the peripheral speed of its agitation blades to 35 m/sec. Further, mix 0.8 parts of a hexamethyl-disilazane-treated hydrophobized silica having an average particle diameter of 8 nm therein by a HENSCHEL MIXER while setting the peripheral speed of its agitation blades to 35 m/sec. Thus, a toner A is prepared.

The hydrophobized rutile-type titanium oxide has a specific weight of 4.2 g/cm³ and a specific surface area of 110 m²/g. The hexamethyl-disilazane-treated hydrophobized silica has a specific weight of 1.2 g/cm³ and a specific surface area of 300 m²/g.

Example 2

Preparation of Toner B

Mix 100 parts of the mother particle A and 0.85 parts of the particulate α-cellulose having a number average particle diameter of 35 nm by a HENSCHEL MIXER while setting the peripheral speed of its agitation blades to 20 m/sec. Further mix 1.0 part of a hexamethyl-disilazane-treated hydrophobized silica having an average particle diameter of 12 nm and a specific surface area of 200 m²/g therein by a HENSCHEL MIXER while setting the peripheral speed of its agitation blades to 35 m/sec. Thus, a toner B is prepared.

Example 3

Preparation of Toner C

Mix 100 parts of the mother particle A and 1.0 part of the particulate α-cellulose having a number average particle diameter of 59 nm by a HENSCHEL MIXER while setting the peripheral speed of its agitation blades to 20 msec. Further mix 0.75 parts of the isobutyl-treated hydrophobized rutile-type titanium oxide having an average particle diameter of 15 nm therein by a HENSCHEL MIXER while setting the peripheral speed of its agitation blades to 35 msec. Further, mix 1.2 parts of a hexamethyl-disilazane-treated hydrophobized silica having an average particle diameter of 20 nm and a specific surface area of 130 m²/g therein by a HENSCHEL MIXER while setting the peripheral speed of its agitation blades to 35 msec. Thus, a toner C is prepared.

Example 4

Preparation of Toner D

Mix 100 parts of the mother particle A and 0.5 parts of the particulate α-cellulose having a number average particle diameter of 90 nm by a HENSCHEL MIXER while setting the peripheral speed of its agitation blades to 20 msec. Further mix 1.0 part of the isobutyl-treated hydrophobized rutile-type titanium oxide having an average particle diameter of 15 nm therein by a HENSCHEL MIXER while setting the peripheral speed of its agitation blades to 35 msec. Further, mix 0.8 parts of the hexamethyl-disilazane-treated hydrophobized silica having an average particle diameter of 12 nm therein by a HENSCHEL MIXER while setting the peripheral speed of its agitation blades to 35 msec. Thus, a toner D is prepared.

Example 5

Preparation of Toner G

Mix 100 parts of the mother particle B and 0.5 parts of the particulate α-cellulose having a number average particle diameter of 90 nm by a HENSCHEL MIXER while setting the peripheral speed of its agitation blades to 20 msec. Further mix 0.75 parts of the isobutyl-treated hydrophobized rutile-type titanium oxide having an average particle diameter of 15 nm therein by a HENSCHEL MIXER while setting the peripheral speed of its agitation blades to 35 msec. Further, mix 0.8 parts of the hexamethyl-disilazane-treated hydrophobized silica having an average particle diameter of 8 nm therein by a HENSCHEL MIXER while setting the peripheral speed of its agitation blades to 35 msec. Thus, a toner G is prepared.

Example 6

Preparation of Toner H

Mix 100 parts of the mother particle B and 1.2 parts of the particulate α-cellulose having a number average particle diameter of 21 nm by a HENSCHEL MIXER while setting the peripheral speed of its agitation blades to 20 msec. Further mix 1.2 parts of the hexamethyl-disilazane-treated hydrophobized silica having an average particle diameter of 12 nm therein by a HENSCHEL MIXER while setting the peripheral speed of its agitation blades to 35 msec. Thus, a toner H is prepared.

Comparative Example 1

Preparation of Toner E

Mix 100 parts of the mother particle A and 0.5 parts of the particulate α-cellulose having a number average particle diameter of 13 nm by a HENSCHEL MIXER while setting the peripheral speed of its agitation blades to 20 msec. Further mix 1.0 part of the isobutyl-treated hydrophobized rutile-type titanium oxide having an average particle diameter of 15 nm therein by a HENSCHEL MIXER while setting the peripheral speed of its agitation blades to 35 msec. Further, mix 0.8 parts of the hexamethyl-disilazane-treated hydrophobized silica having an average particle diameter of 12 nm therein by a HENSCHEL MIXER while setting the peripheral speed of its agitation blades to 35 msec. Thus, a toner E is prepared.

Comparative Example 2

Preparation of Toner F

Mix 100 parts of the mother particle A and 0.85 parts of the particulate α-cellulose having a number average particle diameter of 111 nm by a HENSCHEL MIXER while setting the peripheral speed of its agitation blades to 20 msec. Further mix 1.0 part of the hexamethyl-disilazane-treated hydrophobized silica having an average particle diameter of 20 nm therein by a HENSCHEL MIXER while setting the peripheral speed of its agitation blades to 35 msec. Thus, a toner F is prepared.

Evaluations

Each of the above-prepared toners is mixed with the carrier to prepare each two-component developer. The two-component developers are subjected to the following evaluations in terms of filming property, image quality, photoreceptor damage, and charge stability.

An image forming apparatus used for the following evaluations includes a photoreceptor (i.e., a latent image bearing member) that bears an electrostatic latent image; a charging roller (i.e., a charger) disposed in proximity to or in contact with the photoreceptor that uniformly charges the photoreceptor; an irradiator that irradiates the photoreceptor with light to form an electrostatic latent image thereon; a developing device that develops the electrostatic latent image into a toner image with the above-prepared developer; a transfer belt (i.e., a transfer member) that transfers the toner image from the photoreceptor onto a transfer paper; a cleaner that removes residual toner particles remaining on the photoreceptor; a neutralization lamp (i.e., a neutralizer) that removes residual charges remaining on the photoreceptor; and an optical sensor that controls the voltage supplied from the charging roller and the toner concentration in the developer. The developing device is supplied with the above-prepared toner from a toner supply device through a toner supply opening.

An image forming operation is as follows. First, the photoreceptor starts rotating counterclockwise. The photoreceptor is neutralized by light so as to have an average surface potential of 0 to −150 V. The photoreceptor is then charged by the charger so as to have a surface potential of about −1,000 V. The photoreceptor is further irradiated with light emitted from the irradiator so that the irradiated area (i.e., image area) has a surface potential of 0 to −200V. The developing device supplies the toner to the image area from the developing sleeve. A paper feed part feeds a sheet of the transfer paper onto the transfer belt so that a leading edge of the sheet coincides with a leading edge of the toner image having been conveyed by rotation of the photoreceptor. As a result, the toner image is transferred from the photoreceptor onto the sheet on the transfer belt. The toner image is fixed on the sheet upon application of heat and pressure in a fixer. The sheet having the fixed toner image is discharged from the image forming apparatus. Residual toner particles remaining on the photoreceptor are removed by a cleaning blade in the cleaner. Subsequently, residual charges remaining on the photoreceptor are neutralized by the neutralization lamp. Thus, the photoreceptor gets ready for a next image forming operation.

(1) Filming Property

Print a test chart having an image density of 6% on 30,000 sheets of paper by the image forming apparatus in a testing room at 10° C., 15% RH. Visually observe every 1,000th image to determine whether undesirable white spots are generated or not. Filming property is evaluated by the number of sheets until which no white spots are generated. The results are shown in Table 1.

(2) Image Quality

Image quality is comprehensively evaluated from two points: the degrees of defective transfer and background fouling. To determine the degree of defective transfer, continuously produce an image on 5,000 sheets of paper, then produce a black solid image, and visually observe the black solid image. To determine the degree of background fouling, continuously produce an image on 5,000 sheets of paper, then develop a white solid image, and quantify toner particles present on the photoreceptor during the development of the white solid image. Specifically, interrupt the development of the white solid image and transfer toner particles present on the photoreceptor onto SCOTCH tape (from Sumitomo 3M). Subject the SCOTCH tape having the toner particles to a measurement of image density by a spectrodensitometer (from X-Rite). When the image density difference between a blank SCOTCH tape is less than 0.30, the degree of background fouling is regarded as being low (good). When the image density difference between a blank SCOTCH tape is 0.30 or more, the degree of background fouling is regarded as being high (poor). Image quality is graded into the following three ranks based on the degrees of defective transfer and background fouling determined as above. The results are shown in Table 1.

A: Good.
B: Not good but acceptable.
C: Poor (3) Photoreceptor Damage

After producing an image having a density of 4% on 100,000 sheets of paper by the image forming apparatus, visually observe the photoreceptor to determine whether scratch is made thereon or not. The results are shown in Table 1.

A: No scratch or slight scratch is observed. Good.
B: Scratch is observed but the resulting image is good. Acceptable.
C: Irreversible scratch is observed or the resulting image is defective.

(4) Charge Stability

Mix and agitate the carrier and each toner by a ball mill for 5 minutes to prepare a developer having a toner concentration of 7%. Subject the developer to humidity control at 35° C., 85% RH for one night. Agitate the developer again by the ball mill for 1 minute and then subject it for a measurement of charge quantity (Q(1)) by a blow-off charge quantity measuring device (TB-200 from Toshiba Chemical Corporation). Similarly, agitate the developer again by the ball mill for 60 minutes and then subject it for a measurement of charge quantity (Q(60)) by the blow-off charge quantity measuring device.

Here, Q(1) represents an initial charge quantity and Q(60) represents a deteriorated charge quantity. Charge stability is evaluated by the Qst value calculated as follows. The results are shown in Table 1.

$$Qst = |1 - (Q(60)/Q(1))| \times 100$$

A: Qst is less than 20
B: Qst is not less than 20 and less than 40
C: Qst is not less than 40

TABLE 1

| | Toner | Filming | Image Quality | Photoreceptor Damage | Charge Stability |
|---|---|---|---|---|---|
| Example 1 | A | Not occur | A | A | A |
| Example 2 | B | Not occur | A | A | A |
| Example 3 | C | Not occur | A | A | A |
| Example 4 | D | Not occur | A | B | B |
| Comparative Example 1 | E | 11,000th | B | A | C |
| Comparative Example 2 | F | 18,000th | C | C | C |
| Example 5 | G | Not occur | B | A | A |
| Example 6 | H | Not occur | A | B | B |

Additional modifications and variations in accordance with further embodiments of the present invention are possible in light of the above teachings. It is therefore to be understood that within the scope of the appended claims the invention may be practiced other than as specifically described herein.

What is claimed is:

1. A toner, comprising:
   a mother particle, the mother particle including:
      a binder resin;
      a colorant; and
      a release agent; and
   an external additive covering a surface of the mother particle, the external additive including:
      a particulate cellulose having a number average particle diameter within a range of 15 to 105 nm.

2. The toner according to claim 1, wherein the particulate cellulose is a particulate α-cellulose.

3. The toner according to claim 1, wherein the external additive further includes at least one material selected from the group consisting of a particulate silica, a particulate titanium compound, a particulate alumina, a particulate cerium oxide, a particulate calcium carbonate, a particulate magnesium carbonate, a particulate calcium phosphate, a particulate fluorine-containing resin, a particulate silicon-containing resin, and a particulate nitrogen-containing resin.

4. The toner according to claim 3, wherein the particulate titanium compound is obtained by reacting at least a part of $TiO(OH)_2$ with a silane compound or silicone oil, the $TiO(OH)_2$ prepared by a wet method.

5. The toner according to claim 3, wherein the particulate titanium compound has a specific weight within a range of 2.8 to 3.6 g/cm$^3$.

6. The toner according to claim 1, wherein the external additive includes at least one material having a specific surface area within a range of 20 to 300 m$^2$/g.

7. A one-component developer, comprising:
   the toner according to claim 1; and
   no carrier.

8. A two-component developer, comprising:
   the toner according to claim 1; and
   a carrier.

9. An image forming apparatus, comprising:
   a latent image bearing member adapted to bear an electrostatic latent image;
   a charger adapted to charge a surface of the latent image bearing member;
   an irradiator adapted to irradiate the charged surface of the latent image bearing member to form an electrostatic latent image thereon;
   a developing device adapted to develop the electrostatic latent image into a toner image with the toner according to claim 1; and
   a transfer device adapted to transfer the toner image onto a transfer material.

10. A process cartridge detachably attachable to image forming apparatuses, the process cartridge comprising:
   a latent image bearing member adapted to bear an electrostatic latent image; and
   a developing device adapted to develop the electrostatic latent image into a toner image with the toner according to claim 1.

* * * * *